US010277827B2

United States Patent
Ohki

(10) Patent No.: US 10,277,827 B2
(45) Date of Patent: Apr. 30, 2019

(54) IMAGING APPARATUS AND ELECTRONIC APPARATUS

(71) Applicant: SONY CORPORATION, Tokyo (JP)

(72) Inventor: Mitsuharu Ohki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/736,585

(22) PCT Filed: Apr. 7, 2017

(86) PCT No.: PCT/JP2017/014455
§ 371 (c)(1),
(2) Date: Dec. 14, 2017

(87) PCT Pub. No.: WO2017/183480
PCT Pub. Date: Oct. 26, 2017

(65) Prior Publication Data
US 2019/0037120 A1  Jan. 31, 2019

(30) Foreign Application Priority Data

Apr. 22, 2016 (JP) ................................. 2016-086216

(51) Int. Cl.
*H04N 5/235* (2006.01)
*H04N 5/225* (2006.01)
*H04N 5/369* (2011.01)

(52) U.S. Cl.
CPC ......... *H04N 5/2353* (2013.01); *H04N 5/2256* (2013.01); *H04N 5/36965* (2018.08)

(58) Field of Classification Search
CPC ............. H04N 5/2353; H04N 5/36965; H04N 5/2256; G01S 17/08–17/36
See application file for complete search history.

(56) References Cited

U.S. PATENT DOCUMENTS

| 7,009,690 B2 * | 3/2006 | Kamon | G01B 11/25 348/348 |
| 2011/0304842 A1 * | 12/2011 | Kao | G01S 17/89 356/5.01 |
| 2012/0320219 A1 * | 12/2012 | David | G01S 7/483 348/169 |

FOREIGN PATENT DOCUMENTS

| CA | 2792050 A1 | 9/2011 |
| EP | 2542913 A1 | 1/2013 |

(Continued)

OTHER PUBLICATIONS

International Search Report and Written Opinion of PCT Application No. PCT/JP2017/014455, dated Apr. 7, 2017, 06 pages of ISRWO.

*Primary Examiner* — Nelson D. Hernández Hernández
(74) *Attorney, Agent, or Firm* — Chip Law Group

(57) ABSTRACT

The present disclosure relates to an imaging apparatus and an electronic apparatus that are capable of receiving light a plurality of times temporally per pulse emission. After instructing a light emitting unit to perform pulse emission, a control unit instructs an image sensor to start exposure at a time T11=(2×D11)/c, finish exposure at a time T21=(2×D21)/c, start exposure at a time T12=(2×D12)/c, finish exposure at a time T22=(2×D22)/c, start exposure at a time T13=(2×D13)/c, and finish exposure at a time T21=(2×D23)/c. The present disclosure is applicable to, for example, a gated imaging apparatus that is an apparatus that emits pulsed light and performs imaging for only a specific time period.

8 Claims, 27 Drawing Sheets

(56) References Cited

FOREIGN PATENT DOCUMENTS

| | | | |
|---|---|---|---|
| IL | 221684 | A | 10/2016 |
| JP | 2010-170449 | A | 8/2010 |
| WO | 2011/107987 | A1 | 9/2011 |
| WO | 2013/179280 | A1 | 12/2013 |

* cited by examiner

FIG. 16A

| Time period during times T11 and T01 | Time period during times T01 and T21 | Time period during times T12 and T02 | Time period during times T02 and T22 | Time period during times T13 and T03 | Time period during times T03 and T23 | Time period during times T14 and T04 | Time period during times T04 and T24 | During other times |
|---|---|---|---|---|---|---|---|---|
| Accumulated in memory 82-1 | Accumulated in memory 82-2 | Accumulated in memory 82-1 | Accumulated in memory 82-2 | Accumulated in memory 82-1 | Accumulated in memory 82-2 | Accumulated in memory 82-1 | Accumulated in memory 82-2 | Discharged to drain |

FIG. 16B

| Time period during times T11 and T01 | Time period during times T01 and T21 | Time period during times T12 and T02 | Time period during times T02 and T22 | Time period during times T13 and T03 | Time period during times T03 and T23 | Time period during times T14 and T04 | Time period during times T04 and T24 | During other times |
|---|---|---|---|---|---|---|---|---|
| Accumulated in memory 82-1 | Accumulated in memory 82-2 | Accumulated in memory 82-1 | Accumulated in memory 82-2 | Accumulated in memory 82-1 | Accumulated in memory 82-2 | Accumulated in memory 82-1 | Accumulated in memory 82-2 | Discharged to drain |

FIG. 16C

| Time period during times T11 and T01 | Time period during times T01 and T21 | Time period during times T12 and T02 | Time period during times T02 and T22 | Time period during times T13 and T03 | Time period during times T03 and T23 | Time period during times T14 and T04 | Time period during times T04 and T24 | During other times |
|---|---|---|---|---|---|---|---|---|
| Accumulated in memory 82-1 | Accumulated in memory 82-2 | Accumulated in memory 82-1 | Accumulated in memory 82-2 | Accumulated in memory 82-1 | Accumulated in memory 82-2 | Accumulated in memory 82-1 | Accumulated in memory 82-2 | Discharged to drain |

| | Imaging for subject 53-1 | | Imaging for subject 53-2 | | Imaging for subject 53-3 | | Imaging for subject 53-4 | |
|---|---|---|---|---|---|---|---|---|
| | Time period during times T11 and T01 | Time period during times T01 and T21 | Time period during times T12 and T02 | Time period during times T02 and T22 | Time period during times T13 and T03 | Time period during times T03 and T23 | Time period during times T14 and T04 | Time period during times T04 and T24 |
| Control C1 | Pattern 0 | | Pattern 0 | | Pattern 0 | | Pattern 0 | |
| Control C2 | Pattern 0 | | Pattern 0 | | Pattern 1 | | Pattern 1 | |
| Control C3 | Pattern 0 | | Pattern 1 | | Pattern 0 | | Pattern 1 | |

FIG.17

| | |
|---|---|
| There is subject that is not imaged in image I11 read from memory 82-1 in gated imaging by control C1, is imaged in image I21 read from memory 82-2 in gated imaging by control C1, is not imaged in image I12 read from memory 82-1 in gated imaging by control C2, is imaged in image I22 read from memory 82-2 in gated imaging by control C2, is not imaged in image I13 read from memory 82-1 in gated imaging by control C3, and is imaged in image I23 read from memory 82-2 in gated imaging by control C3 | T01 is delayed by small time period in next imaging |
| There is subject that is imaged in image I11 read from memory 82-1 in gated imaging by control C1, is not imaged in image I21 read from memory 82-2 in gated imaging by control C1, is imaged in image I12 read from memory 82-1 in gated imaging by control C2, is not imaged in image I22 read from memory 82-2 in gated imaging by control C2, is imaged in image I13 read from memory 82-1 in gated imaging by control C3, and is not imaged in image I23 read from memory 82-2 in gated imaging by control C3 | T01 is advanced by small time period in next imaging |
| There is subject that is not imaged in image I11 read from memory 82-1 in gated imaging by control C1, is imaged in image I21 read from memory 82-2 in gated imaging by control C1, is not imaged in image I12 read from memory 82-1 in gated imaging by control C2, is imaged in image I22 read from memory 82-2 in gated imaging by control C2, is not imaged in image I13 read from memory 82-1 in gated imaging by control C3, and is imaged in image I23 read from memory 82-2 in gated imaging by control C3 | T02 is delayed by small time period in next imaging |
| There is subject that is imaged in image I11 read from memory 82-1 in gated imaging by control C1, is not imaged in image I21 read from memory 82-2 in gated imaging by control C1, is imaged in image I12 read from memory 82-1 in gated imaging by control C2, is not imaged in image I22 read from memory 82-2 in gated imaging by control C2, is imaged in image I13 read from memory 82-1 in gated imaging by control C3, and is not imaged in image I23 read from memory 82-2 in gated imaging by control C3 | T02 is advanced by small time period in next imaging |

FIG.20

| There is subject that | |
|---|---|
| is not imaged in image I11 read from memory 82-1 in gated imaging by control C1, is imaged in image I21 read from memory 82-2 in gated imaging by control C1, is imaged in image I12 read from memory 82-1 in gated imaging by control C2, is not imaged in image I22 read from memory 82-2 in gated imaging by control C2, is not imaged in image I13 read from memory 82-1 in gated imaging by control C3, and is imaged in image I23 read from memory 82-2 in gated imaging by control C3 | T03 is delayed by small time period in next imagin |
| is imaged in image I11 read from memory 82-1 in gated imaging by control C1, is not imaged in image I21 read from memory 82-2 in gated imaging by control C1, is imaged in image I12 read from memory 82-1 in gated imaging by control C2, is not imaged in image I22 read from memory 82-2 in gated imaging by control C2, is imaged in image I13 read from memory 82-1 in gated imaging by control C3, and is not imaged in image I23 read from memory 82-2 in gated imaging by control C3 | T03 is advanced by small time period in next imaging |
| There is subject that is not imaged in image I11 read from memory 82-1 in gated imaging by control C1, is imaged in image I21 read from memory 82-2 in gated imaging by control C1, is not imaged in image I12 read from memory 82-1 in gated imaging by control C2, is imaged in image I22 read from memory 82-2 in gated imaging by control C2, is imaged in image I13 read from memory 82-1 in gated imaging by control C3, and is not imaged in image I23 read from memory 82-2 in gated imaging by control C3 | T04 is delayed by small time period in next imaging |
| There is subject that is imaged in image I11 read from memory 82-1 in gated imaging by control C1, is not imaged in image I21 read from memory 82-2 in gated imaging by control C1, is imaged in image I12 read from memory 82-1 in gated imaging by control C2, is not imaged in image I22 read from memory 82-2 in gated imaging by control C2, is not imaged in image I13 read from memory 82-1 in gated imaging by control C3, and is imaged in image I23 read from memory 82-2 in gated imaging by control C3 | T04 is advanced by small time period in next imaging |

FIG.21

IMAGING APPARATUS AND ELECTRONIC APPARATUS

CROSS REFERENCE TO RELATED APPLICATIONS

This application is a U.S. National Phase of International Patent Application No. PCT/JP2017/014455 filed on Apr. 7, 2017, which claims priority benefit of Japanese Patent Application No. 2016-086216 filed in the Japan Patent Office on Apr. 22, 2016. Each of the above-referenced applications is hereby incorporated herein by reference in its entirety.

TECHNICAL FIELD

The present disclosure relates to an imaging apparatus and an electronic apparatus, and particularly to an imaging apparatus and an electronic apparatus that are capable of receiving light a plurality of times temporally per pulse emission.

BACKGROUND ART

There is an imaging technology known by the name of Active Gated Imaging, Active Imaging, Range-gated Active Imaging, or the like. It is called gated imaging in Japanese, and will be referred to as the gated imaging hereinafter.

The gated imaging is a technology capable of sharply imaging only a subject at a specific distance by emitting pulsed light and picking up an image by an image sensor for only a specific time period.

In this technology, in the case where there are a plurality of subjects, it has been necessary to pick up an image a plurality of times as shown in patent Literature 1.

CITATION LIST

Patent Literature

Patent Literature 1: WO 2013-179280

DISCLOSURE OF INVENTION

Technical Problem

That is, in the case where there are a plurality of subjects, for example, it has been difficult to perform appropriate gated imaging.

The present disclosure has been made in view of the above circumstances to be capable of receiving light a plurality of times temporally per pulse emission.

Solution to Problem

An imaging apparatus according to an aspect of the present technology includes: a light emitting unit that performs pulse emission; a light reception unit that receives light; an exposure control unit that causes the light reception unit to perform a plurality of times of exposure per pulse emission from the light emitting unit; and a setting unit that sets, depending on a predetermined imaging distance range, a start time and an end time of the plurality of times of exposure by using timing of the pulse emission as a reference to perform imaging processing on a subject within the predetermined imaging distance range.

The predetermined imaging distance range may include one to n (n being an integer not less than 2) imaging distance ranges, and when the i-th (i=1 to n) distance range of the predetermined imaging distance range is represented by Min(i) to Max(i) (Min(i)<Max(i)), the number of times of the exposure may be n, and the setting unit may set a start time and an end time of the j-th (j=1 to n) exposure of the n times of exposure to $(2 \times Min(i))/c$ and $(2 \times Max(i))/c$ (c representing a speed of light), respectively.

An amount of light received by the light reception unit may be stored in any of 1 to m (m representing an integer not less than 2) memories, and when the predetermined imaging distance range is represented by Min to Max (Min<Max), the number of times of the exposure may be m, the setting unit may set a start time and an end time of the j-th (j=1 to n) exposure of the m times of exposure to $(2 \times Min)/c + 2 \times (Max-Min) \times (j-1)/c/m$ and $2 \times Min/c + 2 \times (Max-Min) \times j/c/m$ (c representing a speed of light), respectively, and the control unit may perform such control that an amount of light received in the j-th (j=1 to n) exposure of the m times of exposure is stored in the j-th memory of the m memories.

The imaging apparatus may further include a subject identification unit that identifies a memory storing no data of a projected image of the subject out of the m memories, in which in a case where the memory storing no data of the projected image of the subject identified by the subject identification unit is the p-th memory and p=m or p substantially equals to m, a smaller value may be reset for at least one of a value of the Min and a value of the Max, and a parameter for next imaging may be determined, or in a case where the memory storing no data of the projected image of the subject identified by the subject identification unit is the p-th memory and p=1 or p substantially equals to 1, a larger value may be reset for at least one of a value of the Min and a value of the Max, and a parameter for next imaging may be determined.

In each of s+1 (s representing an integer not less than 1) times of imaging processing on the subject, an amount of light received by the light reception unit may be stored in any of a first memory and a second memory, the predetermined imaging distance range may include 1 to (2 to the s-th power) imaging distance ranges, and when the k-th (k=1 to 2 to the s-th power) distance range of the predetermined imaging distance range is represented by Min(k) to Max(k) (Min(k)<Max(k)), the number of times of the exposure may be $2 \times (2$ to the s-th power), the setting unit may set a start time and an end time of the 2×k−1-th (k=1 to 2 to the s-th power) exposure of the (2 to the s-th power) times of exposure to $2 \times Min(k)/c$, $2 \times Max(k)/c + 2 \times (Max(k)-Min(k))/c/2$, and $2 \times Max(k)/c$ (c representing a speed of light), respectively, and set a start time and an end time of the 2×k-th (k=1 to 2 to the s-th power) exposure of the (2 to the s-th power) times of exposure to $2 \times Min(k)/c + 2 \times (Max(k)-Min(k))/c/$ and $2 \times Max(k)/c$ (c representing a speed of light), and in the q-th (q representing 1 to s+1) imaging processing, the control unit may perform such control that an amount of light received by the light reception unit in the 2×k−1-th (k=1 to 2 to the s-th power) exposure of the (2 to the s-th power) times of exposure is stored in the r(k,q)-th (r(k,q) representing 1 or 2) memory of the first memory and the second memory, and an amount of light received by the light reception unit in the 2×k-th (k=1 to 2 to the s-th power) exposure of the (2 to the s-th power) times of exposure is stored in a memory other than the r(k,q)-th (r(k,q) representing 1 or 2) memory of the first memory and the second memory, and determine r(k,q) so that a sequence {r(k,1), r(k,2), . . . r(k,s+1)} is different from a sequence {r(k',1), r(k',2), . . . r(k',s+1): where k'≠k} and a sequence {3−r(k',1), r(k',2), . . . r(k',s+1: where k'≠k) for k being an arbitrary value.

The imaging apparatus may further include a subject identification unit that identifies a memory storing no data of a projected image of the subject out of the first memory and the second memory, in which in each of s+1 (s representing an integer not less than 1) times of imaging processing on the subject, the setting unit may reset, corresponding to the number of the memory storing no data of the projected image of the subject identified by the subject identification unit, a smaller value for at least one of a value of the Min and a value of the Max, and determine a parameter for next imaging.

The imaging apparatus may further include a subject identification unit that identifies the j-th (j=1 to n) memory storing data of a projected image of the subject out of the m memories, in which when the number of the memory storing the data of the projected image of the subject identified by the subject identification unit is q, the setting unit may newly set the Min to $2 \times \text{Min}/c + 2 \times (\text{Max}-\text{Min}) \times (q-1)/c/m$ and the Max to $2 \times \text{Min}/c + 2 \times (\text{Max}-\text{Min}) \times q/c/m$ (c representing a speed of light), and determine a parameter for next imaging.

An electronic apparatus according to an aspect of the present technology includes: a light emitting unit that performs pulse emission; a light reception unit that receives light; an exposure control unit that causes the light reception unit to perform a plurality of times of exposure per pulse emission from the light emitting unit; and a setting unit that sets, depending on a predetermined imaging distance range, a start time and an end time of the plurality of times of exposure by using timing of the pulse emission as a reference to perform imaging processing on a subject within the predetermined imaging distance range.

In an aspect of the present technology, a light reception unit that receives light is caused to perform a plurality of times of exposure per pulse emission. Then, a start time and an end time of the plurality of times of exposure are set depending on a predetermined imaging distance range by using timing of the pulse emission as a reference to perform imaging processing on a subject within the predetermined imaging distance range.

Advantageous Effects of Invention

According to the present technology, it is possible to image a subject. In particular, according to the present technology, it is possible to sharply image a plurality of subjects.

It should be noted that the effects described herein are merely examples, and the effects of the present technology are not limited to the effects described herein, and additional effects may be provided.

BRIEF DESCRIPTION OF DRAWINGS

FIGS. 16A, 16B, and 16C are diagrams showing a control method.

FIG. 17 is a diagram showing a combination of patterns.

FIG. 20 is a diagram describing a method of setting the time of the next gated imaging.

FIG. 21 is a diagram describing a method of setting the time of the next gated imaging.

MODE(S) FOR CARRYING OUT THE INVENTION

Hereinafter, embodiments for carrying out the present disclosure (hereinafter, referred to as embodiments) will be described. Note that descriptions will be made in the following order.

0. Overview
1. First Embodiment
2. Second Embodiment
3. Third Embodiment
4. Fourth Embodiment
5. Fifth Embodiment (usage example of image sensor)
6. Sixth Embodiment (example of electronic apparatus)

0. Overview

<Schematic Configuration Example of Solid-State Imaging Apparatus>

Figure 1:
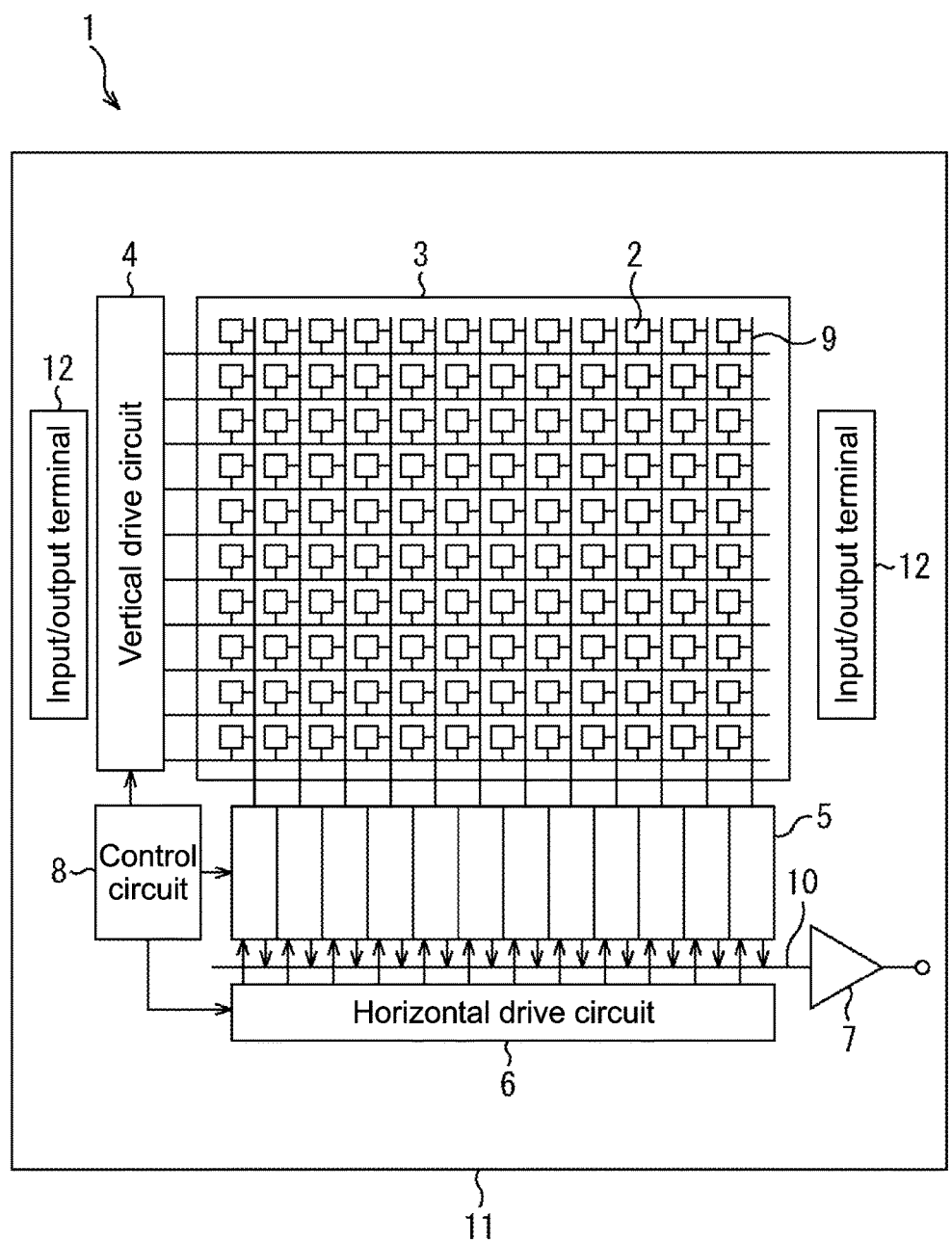
FIG. 1 is a block diagram showing a schematic configuration example of a solid-state imaging apparatus to which the present technology is applied.

FIG. 1 shows a schematic configuration example of an example of a CMOS (Complementary Metal Oxide Semiconductor) solid-state imaging apparatus applied to each embodiment of the present technology.

As shown in FIG. 1, a solid-state imaging apparatus (device chip) 1 includes a pixel area (so-called imaging area) 3 in which pixels 2 each including a plurality of photoelectric conversion devices are regularly two-dimensionally arranged on a semiconductor substrate 11 (e.g., silicon substrate), and a peripheral circuit area.

The pixels 2 each include the photoelectric conversion devices (e.g., PDs (Photo Diodes)) and a plurality of pixel transistors (so-called MOS transistors). The plurality of pixel transistors may include, for example, three transistors of a transfer transistor, a reset transistor, and an amplification transistor, or four transistors including a selection transistor in addition thereto.

Further, the pixels 2 may each have a pixel sharing structure. The pixel sharing structure includes a plurality of photodiodes, a plurality of transfer transistors, one floating diffusion to be shared, and another pixel transistor to be shared. The photodiodes are each a photoelectric conversion device.

The peripheral circuit area includes a vertical drive circuit 4, column signal processing circuits 5, a horizontal drive circuit 6, an output circuit 7, and a control circuit 8.

The control circuit 8 receives an input clock and data for commanding an operation mode or the like, and outputs data such as internal information of the solid-state imaging apparatus 1. Specifically, the control circuit 8 generates, on the basis of a vertical synchronous signal, a horizontal synchronous signal, and a master clock, a clock signal and a control signal as a reference of operations of the vertical drive circuit 4, the column signal processing circuits 5, and the horizontal drive circuit 6. Then, the control circuit 8 inputs these signals to the vertical drive circuit 4, the column signal processing circuits 5, and the horizontal drive circuit 6.

The vertical drive circuit 4 includes, for example, a shift register, selects a pixel driving line, supplies a pulse for driving the pixels 2 to the selected pixel driving line, and drives the pixels 2 row by row. Specifically, the vertical drive circuit 4 sequentially selects and scans each pixel 2 of the pixel area 3 row by row in the vertical direction, and supplies a pixel signal based on a signal charge generated depending on the mount of received light in the photoelectric conversion device of each pixel 2 to the column signal processing circuit 5 via a vertical signal line 9.

The column signal processing circuits 5 are arranged for each column of the pixels 2, for example, and performs signal processing such as noise removal on a signal output from the pixels 2 in one row for each pixel column. Specifically, the column signal processing circuit 5 performs signal processing such as CDS (Correlated Double Sampling) for removing the pattern noise unique to the pixels 2, signal amplification, and A/D (Analog/Digital) conversion. At the output stage of the column signal processing circuit 5, a horizontal selection switch (not shown) connected with a horizontal signal line 10 is provided.

The horizontal drive circuit 6 includes, for example, a shift register, selects each of the column signal processing circuits 5 in order by sequentially outputting a horizontal scanning pulse, and causes each column signal processing circuit 5 to output a pixel signal to the horizontal signal line 10.

The output circuit 7 performs signal processing on the signal sequentially supplied from each of the column signal processing circuits 5 via the horizontal signal line 10, and outputs the signal. The output circuit 7 performs, for example, only buffering, or performs black level adjusting, column variation correction, various types of digital signal processing, and the like in some cases.

Input/output terminals 12 are provided to transmit/receive signals to/from the outside.

<Overview of Gated Imaging>

The present technology is a technology related to the gated imaging. The gated imaging is a technology capable of sharply imaging only a subject at a specific distance by emitting pulsed light and picking up an image by an image sensor for only a specific time. For example, the gated imaging is known by the name of Active Gated Imaging, Active Imaging, Range-gated Active Imaging or the like.

Figure 2:
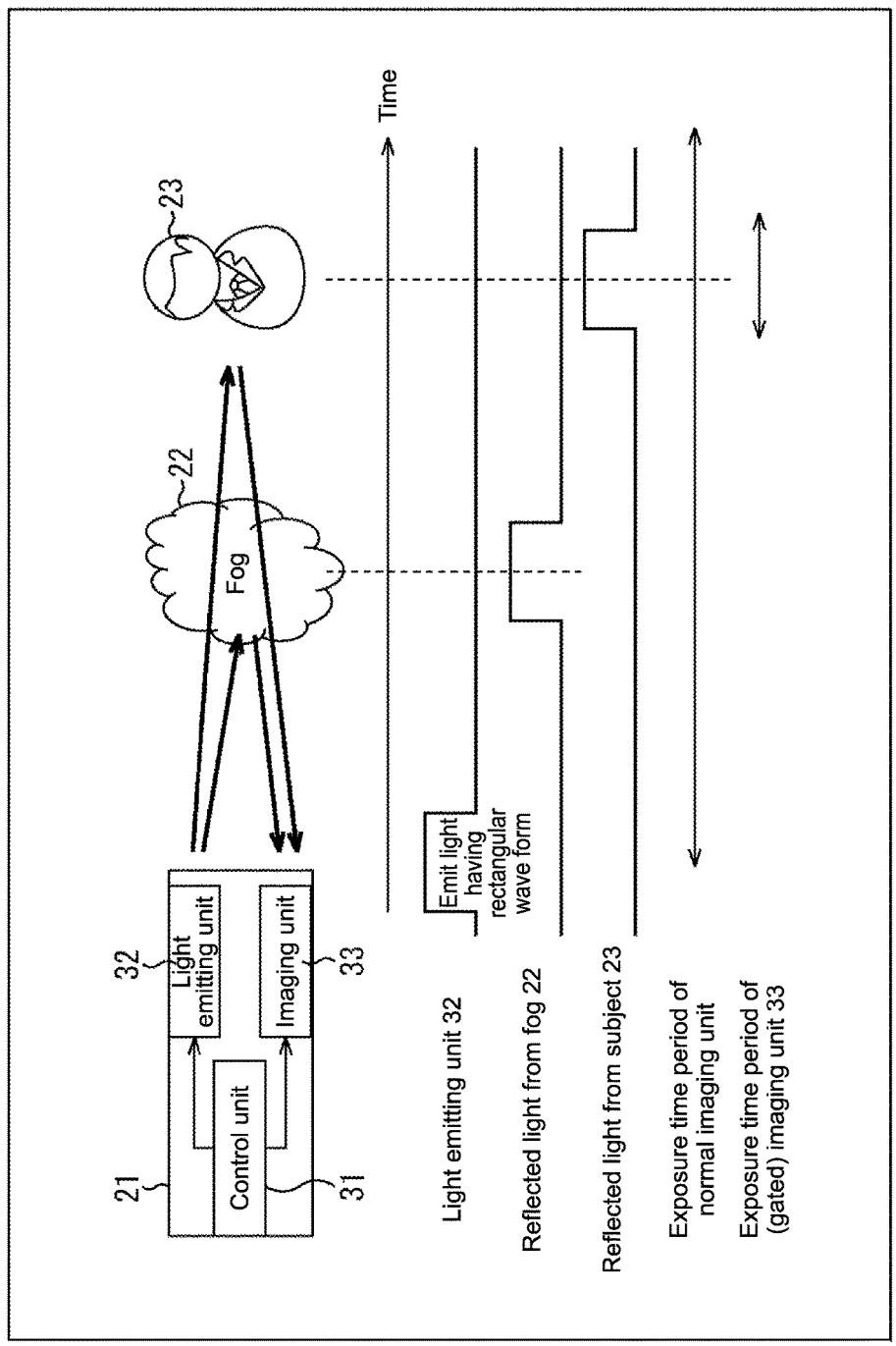
FIG. 2 is a diagram showing an overview of the gated imaging.

The gated imaging will be described with reference to FIG. 2. In the example shown in FIG. 2, a gated imaging apparatus 21 includes a control unit 31, a light emitting unit 32, and an imaging unit 33. The control unit 31 controls the light emission timing of the light emitting unit 32 and the exposure time period of the imaging unit 33. The light emitting unit 32 emits light having a rectangular wave form. The imaging unit 33 exposes a subject 23. In such a gated imaging apparatus 21, it is possible to image the subject 23 beyond a fog 22.

That is, in the case where the light emitting unit 32 emits light having a rectangular wave form, reflected light from the fog 22 reaches the imaging unit 33 first, and then, reflected light from the subject 23 reaches the imaging unit 33.

Note that in the case of a normal imaging unit, the exposure time period is from when light having a rectangular wave form is emitted to when reflected light from the subject 23 reaches the imaging unit, and an image in which the subject 23 is hard to see (hazy image) is obtained because total light of reflected light from the fog 22 and reflected light from the subject 23 is exposed.

Meanwhile, in the case of the imaging unit 33 that performs the gated imaging, since the imaging unit 33 accurately performs exposure for a specific time period, it is possible to image only the reflected light from the subject 23, for example. Therefore, in the gated imaging, it is possible to clearly image a subject in an image.

Next, the gated imaging will be specifically described with reference to FIG. 3. In the example shown in FIG. 3, a gated imaging system 50 is shown.

As the gated imaging system 50, a gated imaging apparatus 51, a fog 52, and a subject 53 are shown in order from the left in the figure.

Figure 3:
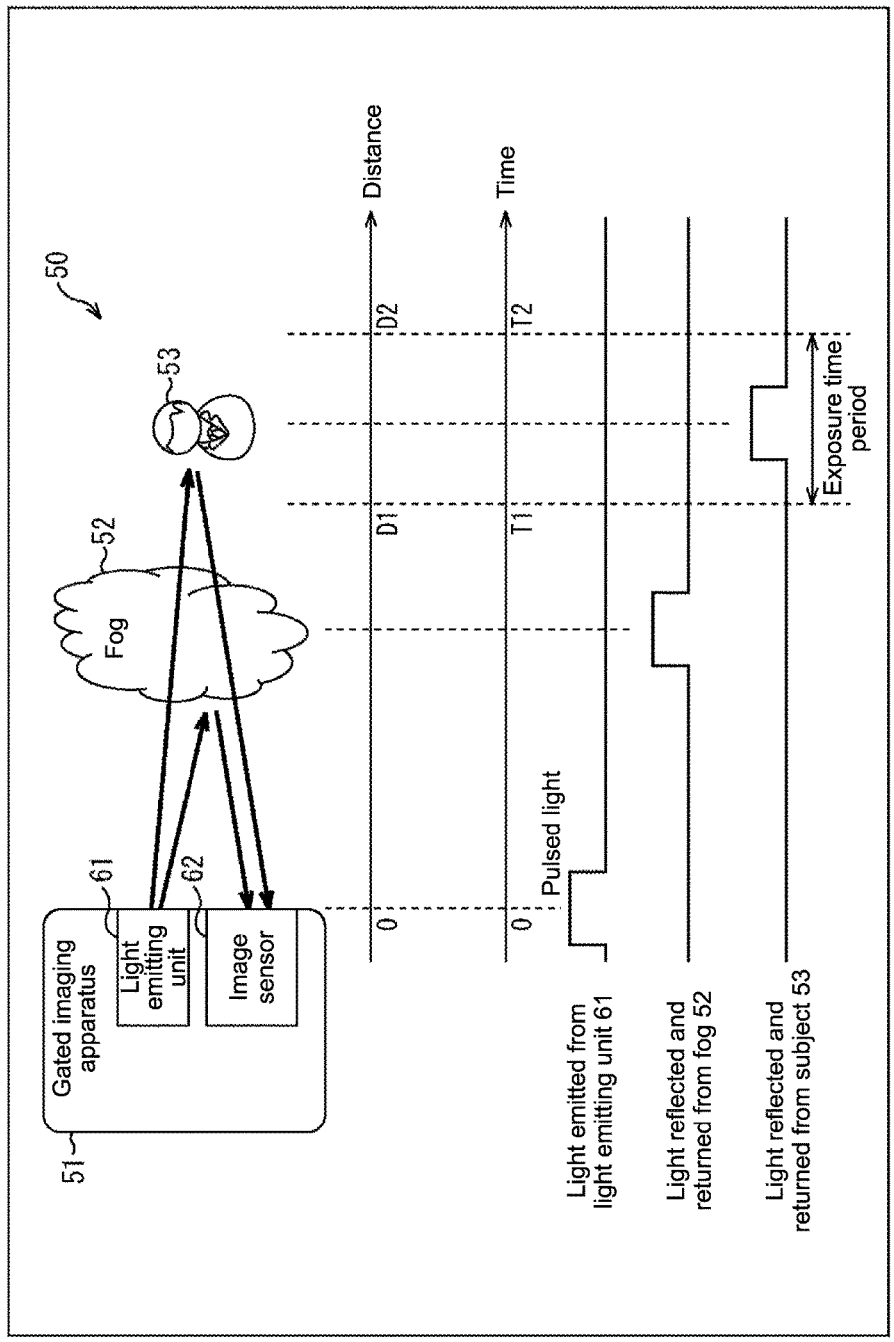
FIG. 3 is a diagram describing the gated imaging.

In the example shown in FIG. 3, the gated imaging apparatus 51 includes a light emitting unit 61 that emits pulsed light, and an image sensor 62 (the solid-state imaging apparatus 1 shown in FIG. 1). For example, assumption is made that the subject 53 is to be imaged by using the gated imaging apparatus 51. There is the fog 52 in front of the subject 53 (i.e., between the gated imaging apparatus 51 and the subject 53).

In this case, as shown in FIG. 3, it is possible to receive only reflected light from the subject 53 without receiving reflected light from the fog 52, by setting distances D1 and D2 (i.e., an exposure start time $T1=(2\times D1)/c$ and an exposure start time $T2=(2\times D2)/c$). As a result, it is possible to pick up a sharp projected image of the subject 53. Note that the c represents the speed of light, and the same applies hereinafter.

Further, "the distance to the fog 52"<D1<"the distance to the subject 52"<D2. Since the time when pulsed light is returned from the fog 52 after the pulsed light is emitted and reflected on the fog 52 is earlier than the time T1=(2×D1)/c, the light is not received by the image sensor 62.

Figure 4:
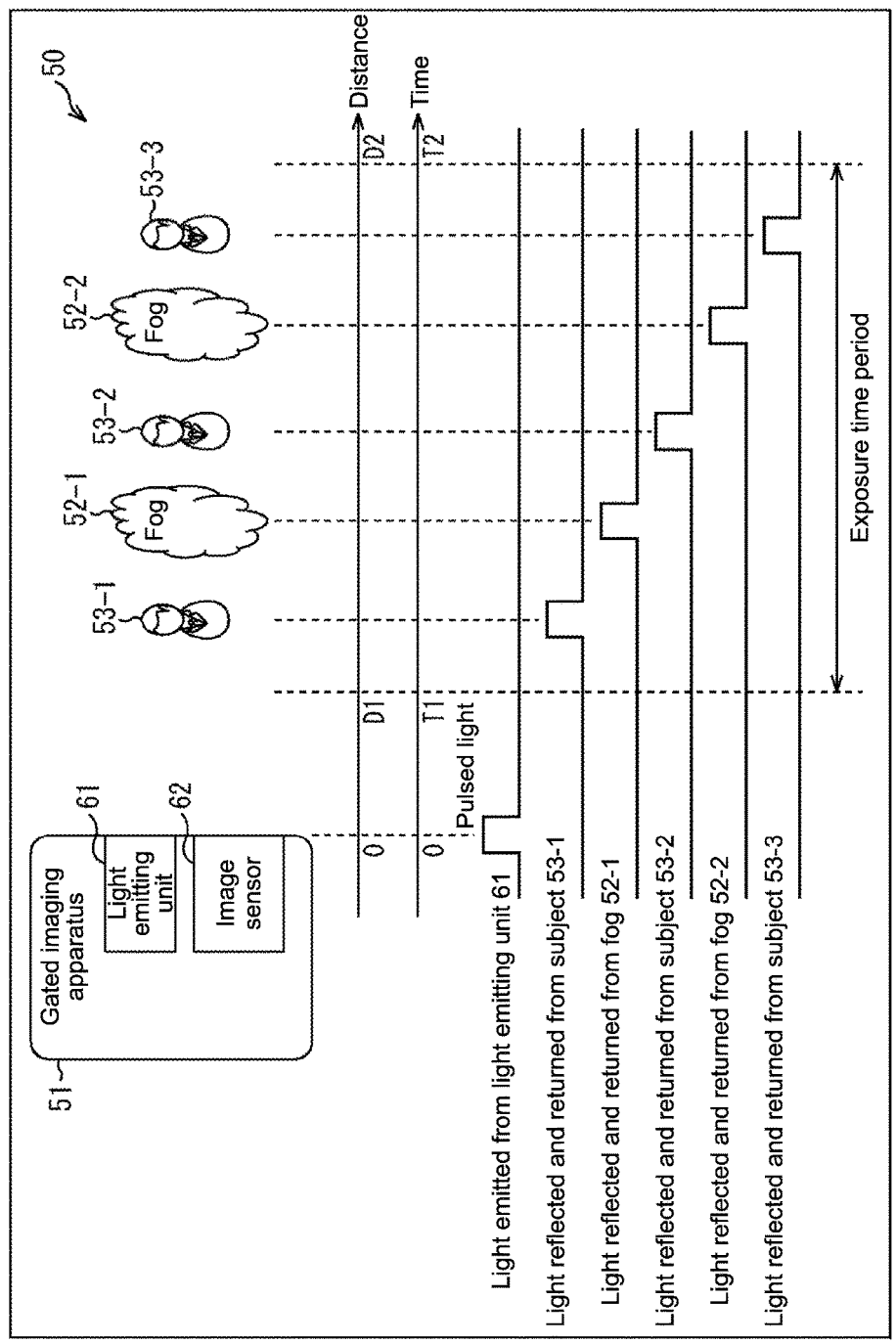
FIG. 4 is a diagram showing an example of the gated imaging in the case where there are a plurality of subjects.

Next, the gated imaging in the case where there are three subjects to be imaged in the gated imaging system 50 will be described with reference to FIG. 4.

In order to image subjects 53-1 to 53-3, there is a need to determine the distances D1 and D2 so that D1<"distance to the subject 53-1"<D2, D1<"distance to the subject 53-2"<D2, and D1<"distance to the subject 53-3"<D2. That is, the exposure start time T1=(2×D1)/c and the exposure start time T2=(2×D2)/c are set as shown in FIG. 4. In this case, the image sensor 62 receives also reflected light from a fog 52-1 and a fog 52-2 shown in FIG. 4, and thus, it has been difficult to acquire a sharp image of the subjects 53-1 to 53-3.

For example, in Patent Literature 1, in the case where there are a plurality of subjects, imaging is performed a plurality of times, and it has been impossible to achieve this by only one imaging. That is, on the assumption that D11<"distance to the subject 53-1"<D21<"distance to the fog 52-1"<D12<"distance to the subject 53-2"<D22<"distance to the fog 52-2"<D13<"distance to the subject 53-3"<D23, first, imaging needs to be performed with D1=D11 and D2=D21, then, imaging needs to be performed with D1=D12 and D2=D22, and finally, imaging needs to be performed with D1=D13 and D2=D23 (imaging needs to be performed a total of three times).

Further, in the case where a subject moves in the depth direction and moves outside the range of D1 to D2, it cannot receive reflected light from the subject, and loses sight of the subject in some cases. It goes without saying that D1 and D2 are reset appropriately depending on the movement of the subject in some cases, but, it has been difficult to perform the resetting because whether the subject has moved to the front of D1 or to the back of D2 is unknown.

In this regard, in the present technology, light reception is performed a plurality of times temporally per pulse emission. Accordingly, it is possible to sharply image a plurality of subjects, know the direction of movement of a subject in the depth direction, and continue to image a moving subject by following the moving subject.

Figure 5:
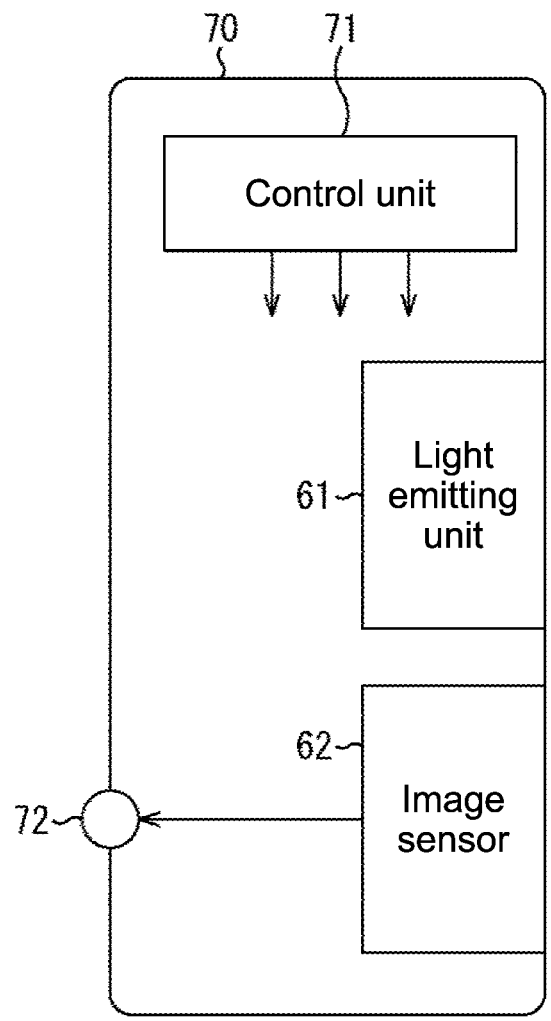
FIG. 5 is a block diagram showing a configuration example of a gated imaging apparatus to which the present technology is applied.

FIG. 5 is a block diagram showing a configuration example of the gated imaging apparatus to which the present technology is applied.

In the example shown in FIG. 5, a gated imaging apparatus 70 includes a control unit 71 and an output terminal 72 in addition to the light emitting unit 61 and the image sensor 62 shown in FIG. 3. The control unit 71 issues a control signal that controls the light emitting unit 61 and the image sensor 62. The light emitting unit 61 emits pulsed light in response to the control signal from the control unit 71. In response to the control signal from the control unit 71, the image sensor 62 performs processing of starting exposure and finishing exposure, and outputs, from the output terminal 72, charges in each pixel accumulated in the exposure. Note that although a lens is provided so as to focus in front of the image sensor 62 actually, illustration thereof is omitted to prevent the figure from being complicated. Similarly, also in the following figures, illustration of the lens is omitted.

The image sensor 62 includes, for example, the solid-state imaging apparatus 1 including the plurality of pixels 2 shown in FIG. 1. The number of pixels is usually several hundred to several thousand both vertically and horizontally.

Figure 6:
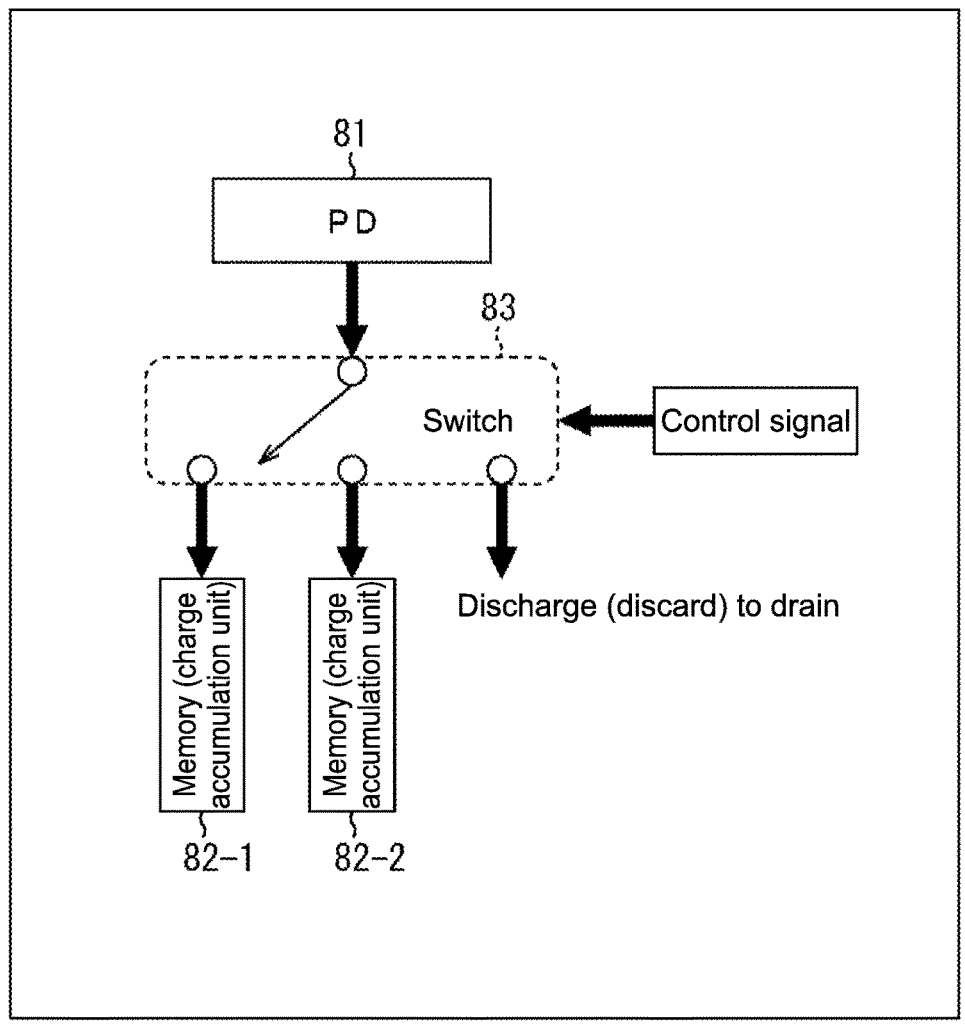
FIG. 6 is a diagram showing a configuration example of a pixel.

FIG. 6 shows a configuration of one pixel 2. Light exposed (received) in a PD (photodiode: light-receiving device) 81 is converted into charges, and the charges are accumulated in a memory (FD: charge accumulation unit) 82-1 or 82-2, which is switched by a switch 83. In the period of time when no exposure is performed, and the charges are discharged (discarded) to a drain switched by the switch 83. This switch 83 is controlled by the control signal from the control unit 71.

Further, the charges accumulated in the memories 82-1 and 82-2 can be output by the output terminal 72 shown in FIG. 5. At the time of outputting the charges accumulated in the memories 82-1 and 82-2 to the output terminal 72, the charges disappear.

Note that an example where there are two memories has been described in the example shown in FIG. 6, also the case where there are three or more memories is possible. However, in the case where there are three or more memories, the layout becomes complicated.

Further, in a first embodiment described below, the memory 82-2 is not used. That is, in the first embodiment, before starting the exposure or after finishing the exposure, light (charges) received by the PD 81 is discarded to the drain. Then, the light received by the PD 81 is accumulated in the memory 82-1 from when starting the exposure and to when finishing the exposure. Note that in this configuration, in the case of resuming the exposure after finishing the exposure, charges are further accumulated in the memory 82-1 by the present exposure in addition to the charges accumulated so far. These controls are performed by the control signal from the control unit 71.

Note that in second to fourth embodiments described below, also the memory 82-2 is used.

1. First Embodiment

<Configuration of Gated Imaging System>

Figure 7:
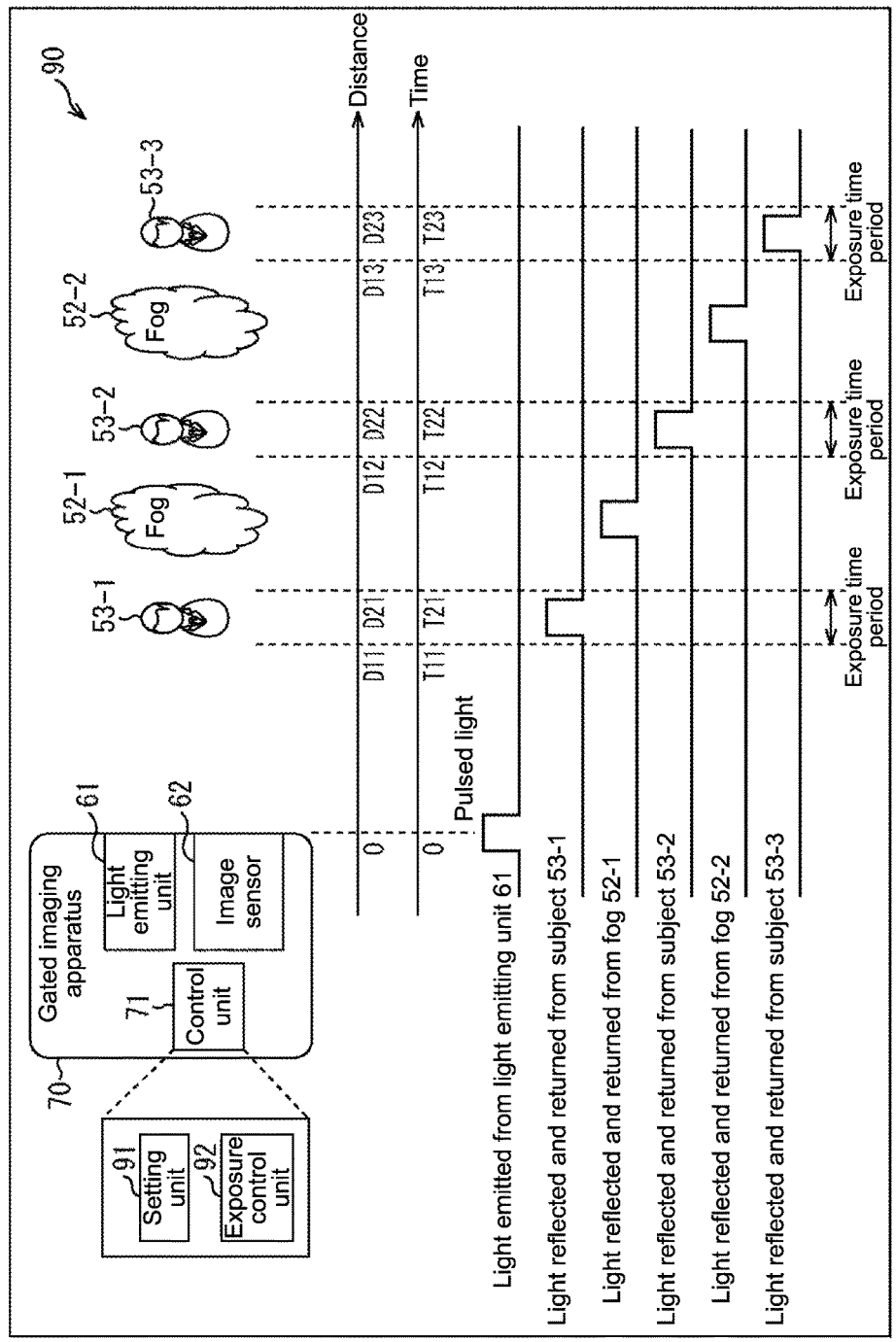
FIG. 7 is a diagram showing a configuration example of a first embodiment of a gated imaging system to which the present technology is applied.

FIG. 7 is a diagram showing a configuration example of a first embodiment of the gated imaging system to which the present technology is applied.

In a gated imaging system 90 shown in FIG. 7, the subjects 53-1 to 53-3 are imaged by using the gated imaging apparatus 70. There is no fog in front of the subject 53-1 (i.e., between the gated imaging apparatus 70 and the subject 53-1). There is the fog 52-1 in front of the subject 53-2 (i.e., between the subject 53-1 and the subject 53-2), and there is the fog 52-2 in front of the subject 53-3 (i.e., between the subject 53-2 and the subject 53-3).

Then, in the gated imaging system 90, exposure is performed a plurality of times (three times in the example shown in FIG. 7) per pulse emission. Note that the control unit 71 includes, for example, an exposure control unit 91 that controls a plurality of times of exposure, and a setting unit 92 that sets the start time and the end time of the plurality of times of exposure. The setting unit 92 sets the start time and the end time of the plurality of times of exposure depending on a predetermined imaging distance range in order to perform processing of imaging a subject in the predetermined imaging distance range, for example, by using the timing of the pulse emission as a reference.

In the gated imaging apparatus 70, after instructing the light emitting unit 61 to perform pulse emission, for example, the setting unit 92 sets the following start time and end time of the plurality of times of exposure. Then, the exposure control unit 91 controls the plurality of times of exposure of the image sensor 62.

Specifically, the start time and the end time of the plurality of times of exposure are as follows.

Exposure is started at the time T11=(2×D11)/c and finished at the time T21=(2×D21)/c.

Exposure is started at the time T12=(2×D12)/c and finished at the time T22=(2×D22)/c.

Exposure is started at the time T13=(2×D13)/c and finished at the time T21=(2×D23)/c. Note that the c represents the speed of light. Further, D11<"distance to the subject 53-1"<D21<"distance to the fog 52-1"<D12<"distance to the subject 53-2"<D22<"distance to the fog 52-2"<D13<"distance to the subject 53-3".

Then, after the time T23, charges accumulated in the memory 82-1 of the pixel 2 of the image sensor 62 are read, and a resulting image I of the gated imaging is obtained from a value of the read pixel.

As shown in FIG. 7, reflected light from the subjects 53-1 to 53-3 is received, and reflected light from the fogs 52-1 and 52-2 is not received. Accordingly, it is possible to acquire sharp projected images of the subjects 53-1 to 53-3.

<Operation of Gated Imaging System>

Next, the gated imaging processing by the gated imaging system 90 shown in FIG. 7 will be described with reference to the flowchart of FIG. 8.

In Step S11, the setting unit 92 specifies the number n of distance ranges to be imaged. Note that in the example shown in FIG. 7, n=3.

In Step S12, the setting unit 92 specifies n distance ranges to be imaged. Assumption is made that these distance ranges are Min(i) to Max(i) (i=1 to n). In the example shown in FIG. 7, Min(1)=D11, Max(1)=D21, Min(2)=D12, Max(2)=D22, Min(3)=D13, and Max(3)=D23.

In Step S13, the exposure control unit 91 switches the switch 83 to the drain and starts to continue to transmit light exposed (charges generated) in the PD 81 to the drain. That is, the charges are caused to be discharged to the drain.

In Step S14, the exposure control unit 91 causes the output terminal 72 to read charges in the memory 82-1 as dummy data in order to reset the charges in the memory 82-1.

In Step S15, the exposure control unit 91 emits pulsed light from the light emitting unit 61, and sets a parameter i to 1. In Step S16, the exposure control unit 91 stands by for only 2*Min(i)/c from the time when emitting the pulsed light, and starts exposure in Step S17. That is, the charges generated in the PD 81 start to be transmitted to the memory 82-1.

In Step S18, the exposure control unit 91 stands by for only 2*Max(i)/c from the time when emitting the pulsed light, and finishes the exposure in Step S19. That is, the charges generated in the PD 81 start to be transmitted to the drain.

In Step S20, the exposure control unit 91 determines whether or not i=n (it is repeated n times). In the case where it is determined in Step S20 that i does not equal to n, the processing proceeds to Step S21. In Step S21, the exposure control unit 91 sets i=i+1, the processing returns to Step S16, and the subsequent processing is repeated.

In the case where it is determined in Step S20 that i=n, the processing proceeds to Step S22. In Step S22, the exposure control unit 91 determines whether or not it is repeated a predetermined number of times. In the case where it is determined in Step S22 that it is not repeated the predetermined number of times, the processing returns to Step S15 and the subsequent processing is repeated.

In the case where the exposure control unit 91 determines in Step S22 that it is repeated the predetermined number of times, the processing proceeds to Step S23. In Step S23, the exposure control unit 91 reads the charges in the memory 82-1 from the output terminal 72 to acquire the resulting image I.

Note that since the amount of light by accumulation in one pulse emission is small, the same processing is performed only the predetermined number of times (one light emission and the plurality of times of exposure in Steps S15 to S20), and the charges are accumulated in the memory 82-1. With such accumulation, it is possible to achieve a sufficient amount of light (charges). The predetermined number of times is, for example, several hundred to several ten thousand.

Further, the longer the distance to the subject is, the weaker the amount of light that is emitted from the light emitting unit 61, reflected on the subject, and returned from the subject. Therefore, in the example shown in FIG. 7, an image in which the subject 53-1 appears with appropriate brightness but the subject 53-2 and the subject 53-3 are dark is obtained in some cases.

In such a case, the gated imaging processing described with reference to FIG. 8 may be performed again (second gated imaging processing). In this second gated imaging processing, n=2, Min(1)=D12, Max(1)=D22, Min(2)=D13, and Max(2)=D23. Accordingly, it is possible to acquire projected images of only the subjects 53-2 and 53-3. However, also in this second gated imaging, since the subjects 53-2 and 53-3 are far away, dark projected images are obtained. In this regard, by adding images obtained by the first gated imaging and the second gated imaging, the brightness of the projected images of only the subjects 53-2 and 53-3 is doubled, and the projected images become sharp.

Figure 8:
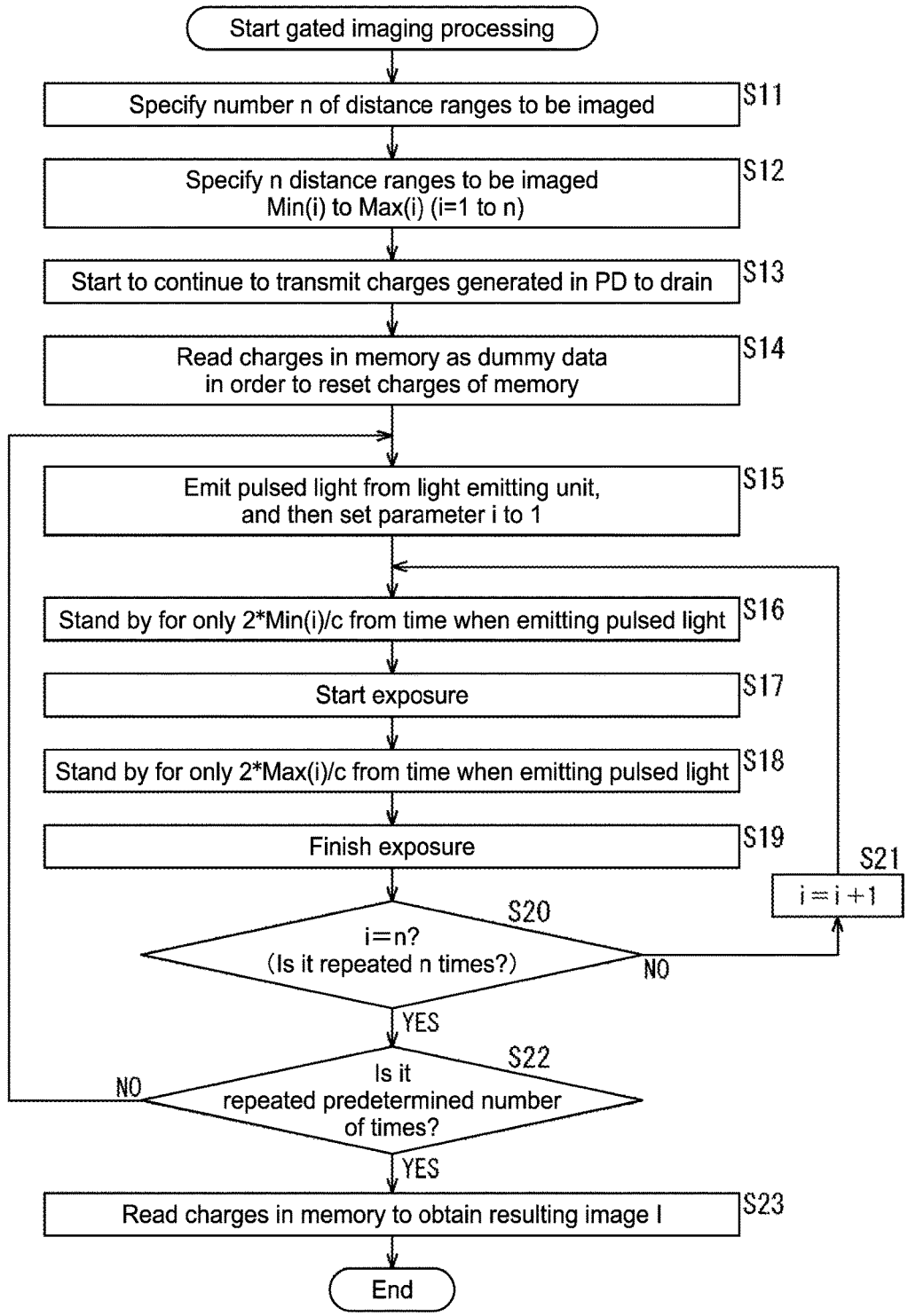
FIG. 8 is a diagram showing another structural example of a mounting substrate to which the present technology is applied.

By performing the gated imaging processing shown in FIG. 8 with the changed parameter n and Min(i) to Max(i) (i=1 to n) and adding images obtained by the processing as described above, it is possible to acquire an image with appropriate brightness for a close subject and a distant subject.

Note that the gated imaging apparatus 70 according to the present technology can be mounted on an automobile and used for monitoring the front. In this case, it is possible to constantly monitor the front by not performing the gated imaging only one time but continuing to perform the gated imaging. The automobile moves by a distance Vc×Tc during the time between the previous gated imaging and the next gated imaging. In this regard, for the next gated imaging, values of Min(i) to Max(i) (i=1 to n) may be reduced by Vc×Tc than those used in the previous gated imaging. By setting as described above, it is possible to continue to appropriately capture the subject even in the case where the gated imaging apparatus 70 is moving.

<Another Configuration of Gated Imaging System>

Further, an example of the case where the gated imaging apparatus 70 according to the present technology is mounted on an automobile will be specifically described with reference to FIG. 9. Note that as a configuration example of the gated imaging apparatus 70, the configuration described with reference to FIG. 5 is used.

Figure 9:
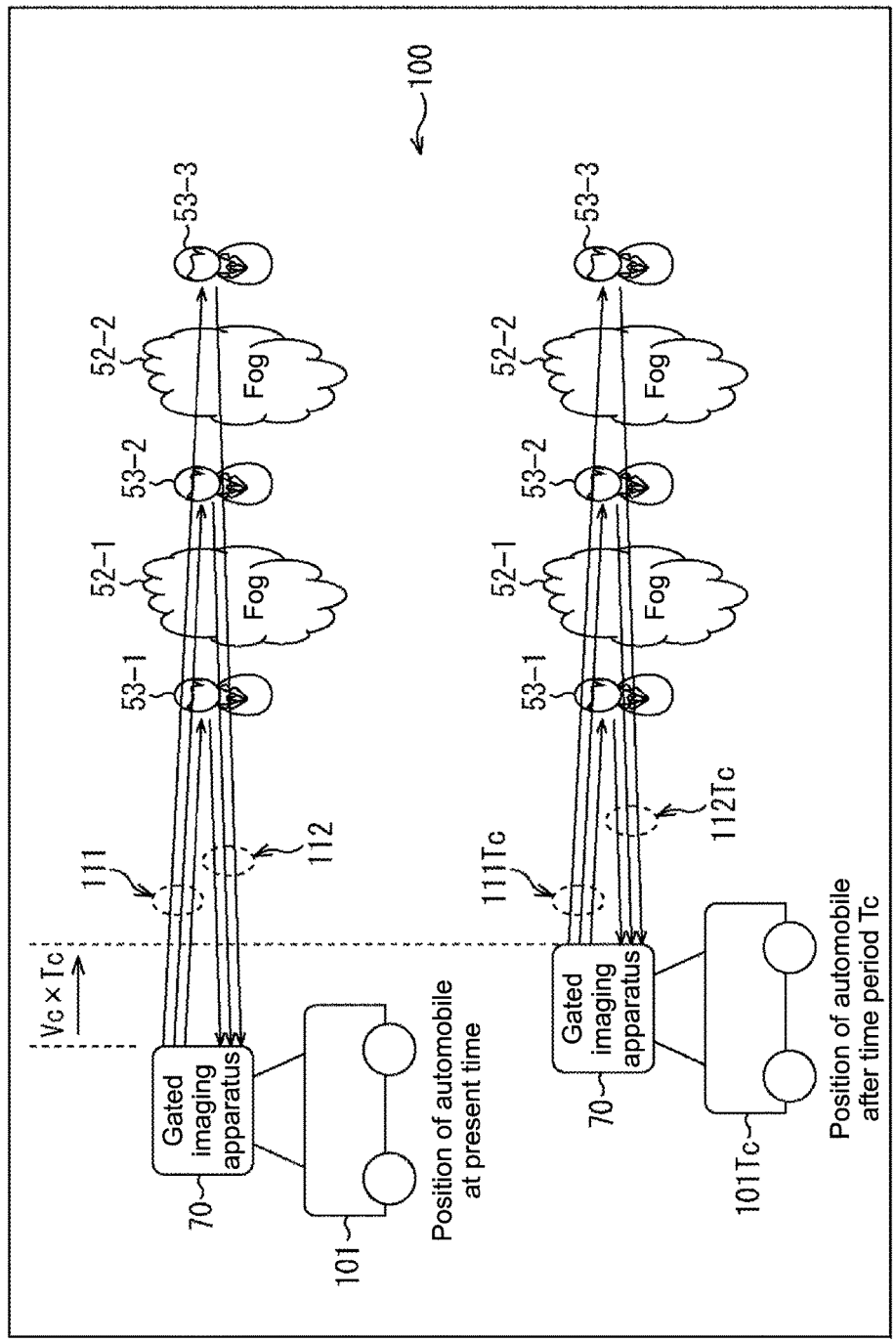
FIG. 9 is a diagram showing an example in the case where the gated imaging apparatus according to the present technology is mounted on an automobile.

In the example shown in FIG. 9, a gated imaging system 100 at the present time is shown in the upper stage of the figure, and the gated imaging system 100 after a time period Tc is shown in the lower stage of the figure.

Assumption is made that in the gated imaging system 100 at the present time, an automobile 101 on which the gated imaging apparatus 70 is mounted is moving in the right direction at a speed Vc. By appropriately performing the gated imaging at the present time, pulsed light 111 emitted from the light emitting unit 61 of the gated imaging apparatus 70 is reflected on the subjects 53-1 to 53-3, and received by the image sensor 63 as reflected light 112. Meanwhile, reflected light from the fogs 52-1 and 52-2 is not received by the image sensor 63. Accordingly, it is possible to acquire sharp projected images of the subjects 53-1 to 53-3. This image is displayed in real time on a monitor (whose illustration is omitted) in the automobile 101, and can support driving of the automobile 101.

Next, the gated imaging is performed again after the time period Tc. In the gated imaging after the time period Tc, an automobile 101Tc has moved by only a distance Vc×Tc. That is, the distance between the gated imaging apparatus 70 and the subjects 53-1 and 53-3 is reduced by only Vc×Tc. In this regard, by reducing the values of Min(i) to Max(i) (i=1 to n) by Vc×Tc as described above, pulsed light 111Tc emitted from the light emitting unit 61 of the gated imaging apparatus 70 is reflected on the subjects 53-1 to 53-3, and received by the image sensor 63 as reflected light 112Tc also in the gated imaging after the time period Tc. Reflected light from the fogs 52-1 and 52-2 is not received by the image sensor 63. Accordingly, it is possible to acquire sharp projected images of the subjects 53-1 to 53-3. This image is displayed in real time on a monitor (whose illustration is omitted) in the automobile 101Tc, and can support driving of the automobile.

2. Second Embodiment

<Configuration of Gated Imaging System>

Figure 10:
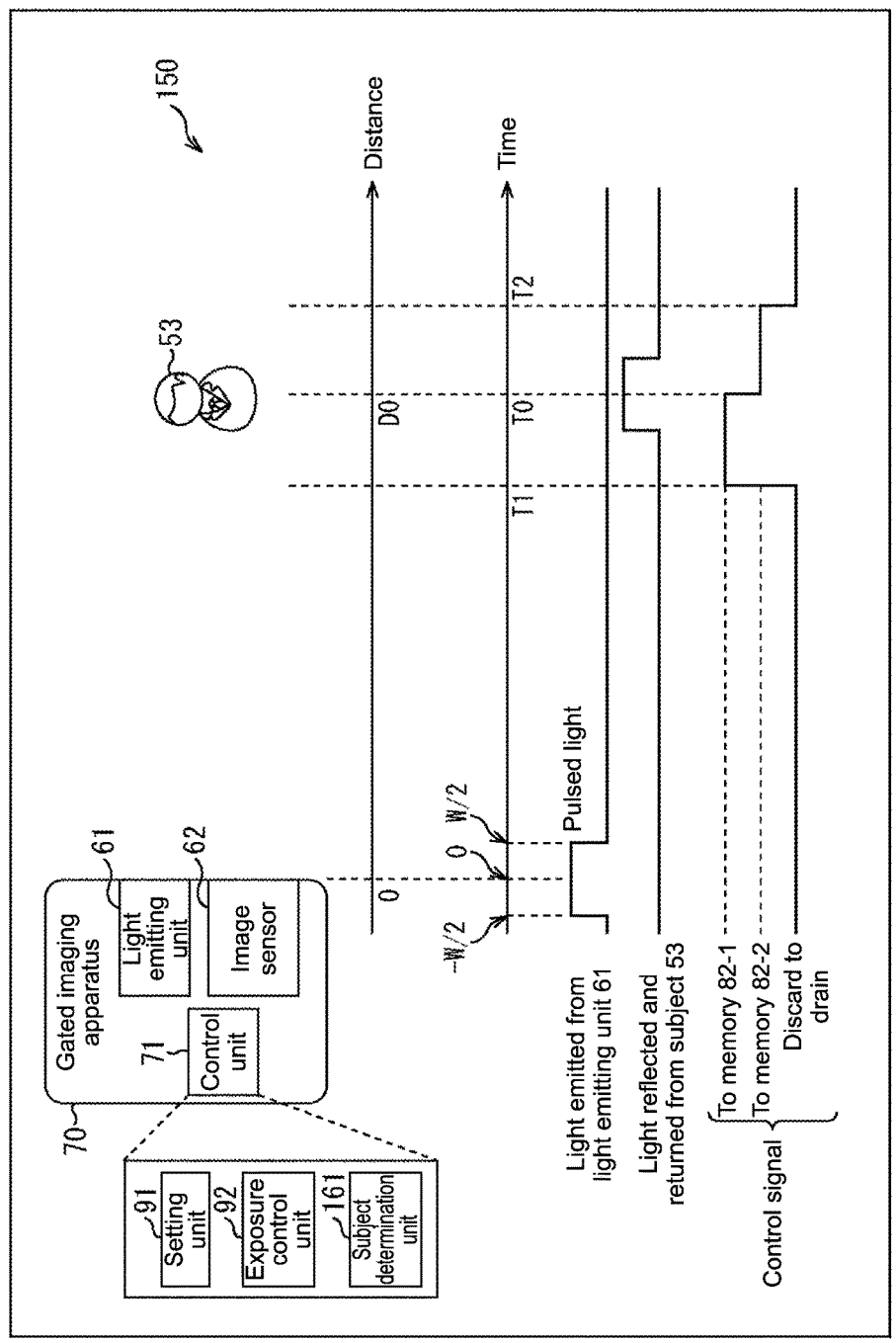
FIG. 10 is a diagram showing a configuration example of a second embodiment of the gated imaging system to which the present technology is applied.

FIG. 10 is a diagram showing a configuration example of a second embodiment of the gated imaging system to which the present technology is applied.

In a gated imaging system 150 shown in FIG. 10, light (charges) exposed (received) by the PD 81 is accumulated in the memory 82-1 or 82-2 or discarded to the drain, at appropriate timing. Note that the gated imaging system 150 shown in FIG. 10 is different from the gated imaging system 50 shown in FIG. 7 in that the control unit 71 further includes a subject determination unit 161 in addition to the exposure control unit 91 and the setting unit 92. The subject determination unit 161 determines (identifies) at what distance the subject is imaged by determining (identifying) in which memory the data of the projected image of the subject is (or is not).

In the example shown in FIG. 10, on the assumption that a distance to the subject 53 is a distance D0, the time period to when pulsed light is reflected on the subject 53 and returned from the subject 53 is $T0=2\times D0/c$. Assumption is made that the width of the pulsed light is a width w, the pulsed light is emitted for the time period from time $-W/2$ to time $W/2$, and $T1=T0-W$ and $T2=T0+W$.

During the time T1 to the time T0, light (charges) exposed (received) by the PD 81 is accumulated in the memory 82-1. During the time T0 to the time T2, light (charges) exposed (received) by the PD 81 is accumulated in the memory 82-2. During the other times, it is discarded to the drain. In the gated imaging system 150 shown in FIG. 10, such control is performed.

The first half of the emitted pulse (light emitted during the time period from the time $-W/2$ to the time 0) is reflected on the subject 53, exposed (received) by the PD 81, and accumulated in the memory 82-1.

The latter half of the emitted pulse (light emitted during the time period from the time 0 to the time W/2) is reflected on the subject 53, exposed (received) by the PD 81, and accumulated in the memory 82-2.

Then, after the time T2, charges accumulated in the memory 82-1 of each pixel 2 of the image sensor 62 are read, and a resulting image I1 of the gated imaging is obtained from the value of the read pixel. Further, charges accumulated in the memory 82-2 of each pixel 2 of the image sensor 62 are read, and a resulting image I2 of the gated imaging is obtained from the value of the read pixel.

In the resulting images I1 and I2, a projected image of the subject 53 is picked up. Note that an image obtained by adding the resulting image I1 and the resulting image I2 may be created to obtain a sharp image of the subject 53 in order to make it easy to see.

Figure 11:
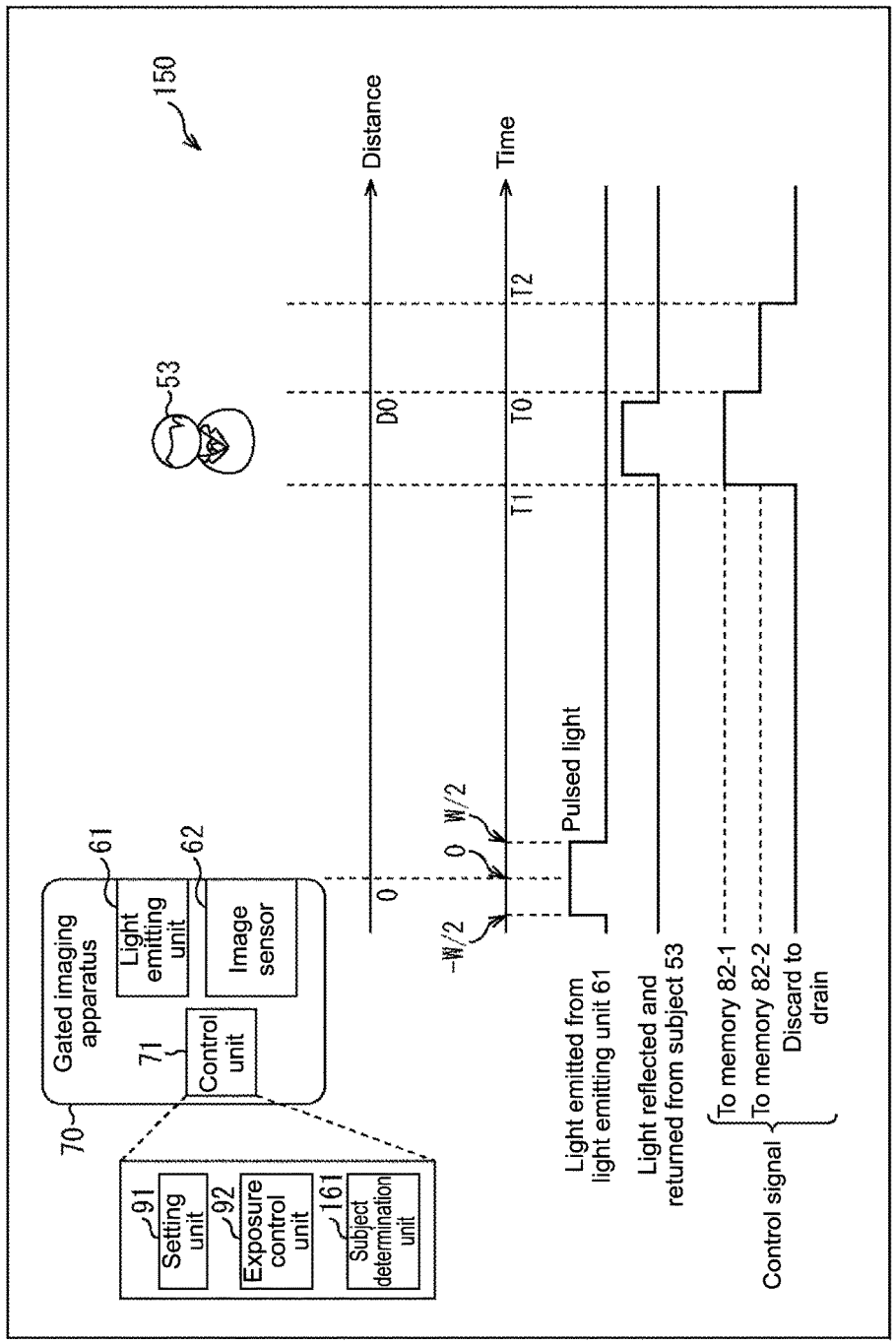
FIG. 11 is a diagram describing the case where a subject moves forward.

Now, next, as shown in FIG. 11, assumption is made that the subject 53 moves forward.

In the example shown in FIG. 11, since the time period to when the light is reflected on the subject 53 and returned from the subject 53 becomes earlier, a projected image of the subject 53 is picked up in the resulting image I1 but not in the resulting image I2.

That is, conversely, in the case where the subject 53 is imaged in the resulting image I1 but not in the resulting image I2, it is found that the subject 53 has moved forward. In this regard, in the case of performing the gated imaging again, the setting unit 92 only needs to set T0 to be larger than the previous value of T0 to perform the gated imaging.

In the gated imaging system 150, in this way, it is possible to continue to perform the gated imaging while following the subject.

That is, according to the second embodiment of the present technology, even in the case where the subject moves in the depth direction, it is possible to achieve the gated imaging capable of continuing to pick up a sharp image by appropriately following the subject.

<Operation of Gated Imaging System>

Next, the gated imaging processing by the gated imaging system 150 shown in FIG. 10 and FIG. 11 will be described with reference to the flowcharts of FIG. 12 and FIG. 13.

Figure 12:
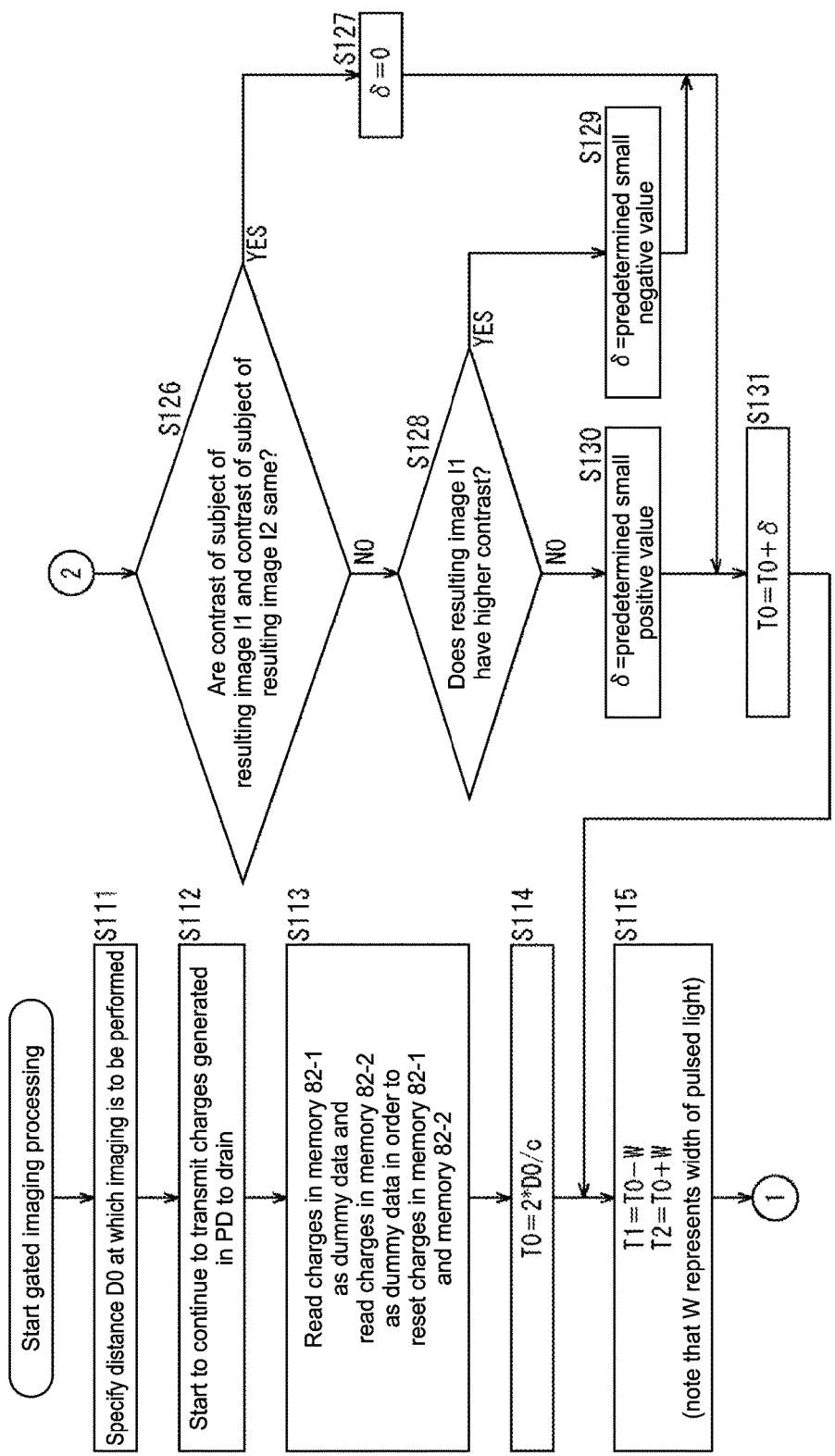
FIG. 12 is a flowchart describing gated imaging processing by the gated imaging system shown in FIG. 10.

In Step S111 in FIG. 12, the setting unit 92 specifies the distance D0 at which imaging is to be performed. In Step S112, the exposure control unit 91 switches the switch 83 to the drain, and starts to transmit charges generated in the PD 81 to the drain. That is, the charges are caused to be discharged to the drain.

In Step S113, the exposure control unit 91 causes the output terminal 72 to read charges in the memory 82-1 as dummy data in order to reset the charges in the memory 82-1, and causes the output terminal 72 to read charges in the memory 82-2 as dummy data in order to reset the charges in the memory 82-2.

The setting unit 92 sets $T0=2*D0/c$ in Step S114, and sets $T1=T0-W$, $T2=T0+W$ (note that W represents the width of pulsed light) in Step S115.

Figure 13:
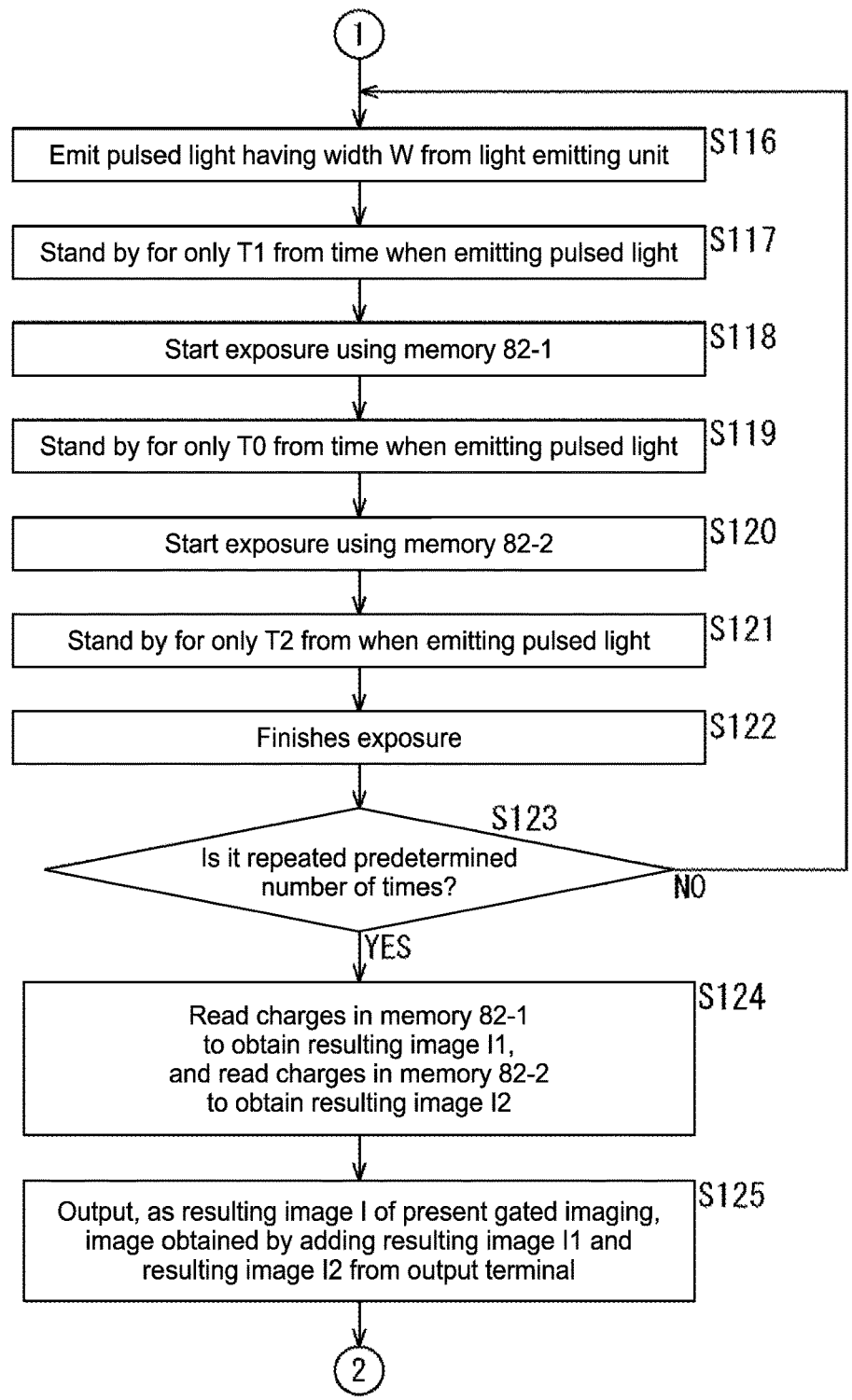
FIG. 13 is a flowchart describing the gated imaging processing by the gated imaging system shown in FIG. 10

In Step S116 in FIG. 13, the exposure control unit 91 emits pulsed light from the light emitting unit 61, stands by for only T1 from the time when emitting the pulsed light in Step S117, and starts exposure using the memory 82-1. That is, the charges generated by the PD 81 start to be transmitted to the memory 82-1.

In Step S119, the exposure control unit 91 stands by for only T0 from the time when emitting the pulsed light, and starts exposure using the memory 82-2 in Step S120. That is, the charges generated by the PD 81 start to be transmitted to the memory 82-2.

The exposure control unit 91 stands by for only T2 from when emitting the pulsed light in Step S121, and finishes the exposure in Step S122. That is, the charges generated by the PD 81 start to be transmitted to the drain.

In Step S123, the exposure control unit 91 determines whether or not it is repeated a predetermined number of times. In the case where it is determined in Step S123 that it is not repeated the predetermined number of times, the processing returns to Step S116, and the subsequent processing is repeated.

In the case where the exposure control unit 91 determines in Step S123 that it is repeated the predetermined number of times, the processing proceeds to Step S124. In Step S124, the exposure control unit 91 reads the charges in the memory 82-1 from the output terminal 72 to obtain the resulting image I1. Further, the exposure control unit 91 reads the charges in the memory 82-2 from the output terminal 72 to obtain the resulting image I2.

In Step S125, the exposure control unit 91 outputs, as the resulting image I of the present gated imaging, an image obtained by adding the resulting image I1 and the resulting image I2 from the output terminal 72.

After that, in Step S126 in FIG. 12, the subject determination unit 161 determines whether or not the contrast of the subject of the resulting image I1 and the contrast of the subject of the resulting image I2 are the same. In the case where it is determined in Step S126 that the contrast of the subject of the resulting image I1 and the contrast of the subject of the resulting image I2 are the same, the processing proceeds to Step S127. In Step S127, the setting unit 92 sets δ=0.

In the case where it is determined in Step S126 that the contrast of the subject of the resulting image I1 and the contrast of the subject of the resulting image I2 differ, the processing proceeds to Step S128. In Step S128, the setting unit 92 determines whether or not the resulting image I1 has higher contrast.

In the case where it is determined in Step S128 that the resulting image I1 has higher contrast, the processing proceeds to Step S129. In Step S129, the setting unit 92 sets δ=predetermined small negative value.

In the case where it is determined in Step S128 that the resulting image I1 has lower contrast, the processing proceeds to Step S130. In Step S130, the setting unit 92 sets δ=predetermined small positive value.

After Step S127, Step S129, and Step S130, the processing proceeds to Step S131. In Step S131, the setting unit 92 sets T0=T0+δ, the processing returns to Step S115, and the subsequent processing is repeated.

Note that in the gated imaging processing shown in FIG. 12 and FIG. 13, whether or not it is imaged in the resulting image I1 and whether or not in the resulting image I2, i.e., in which memory of the memories 82-1 and 82-2 the data of a projected image is not is determined by using projected images of the two images.

Further, in the above description, the exposure time is represented by the width W of pulsed light. It is not particularly limited to w, but it is favorably w. This is because by setting the exposure time to w, all the pulsed light that is emitted from the light emitting unit 61 and reflected on the subject 53 is exposed, and it is not necessary to expose reflected light from an object (e.g., fog that is not shown) that is at another distance.

<Another Configuration of Gated Imaging System>

Further, a specific example of use of the second embodiment of the present technology will be described with reference to FIG. 14.

Figure 14:
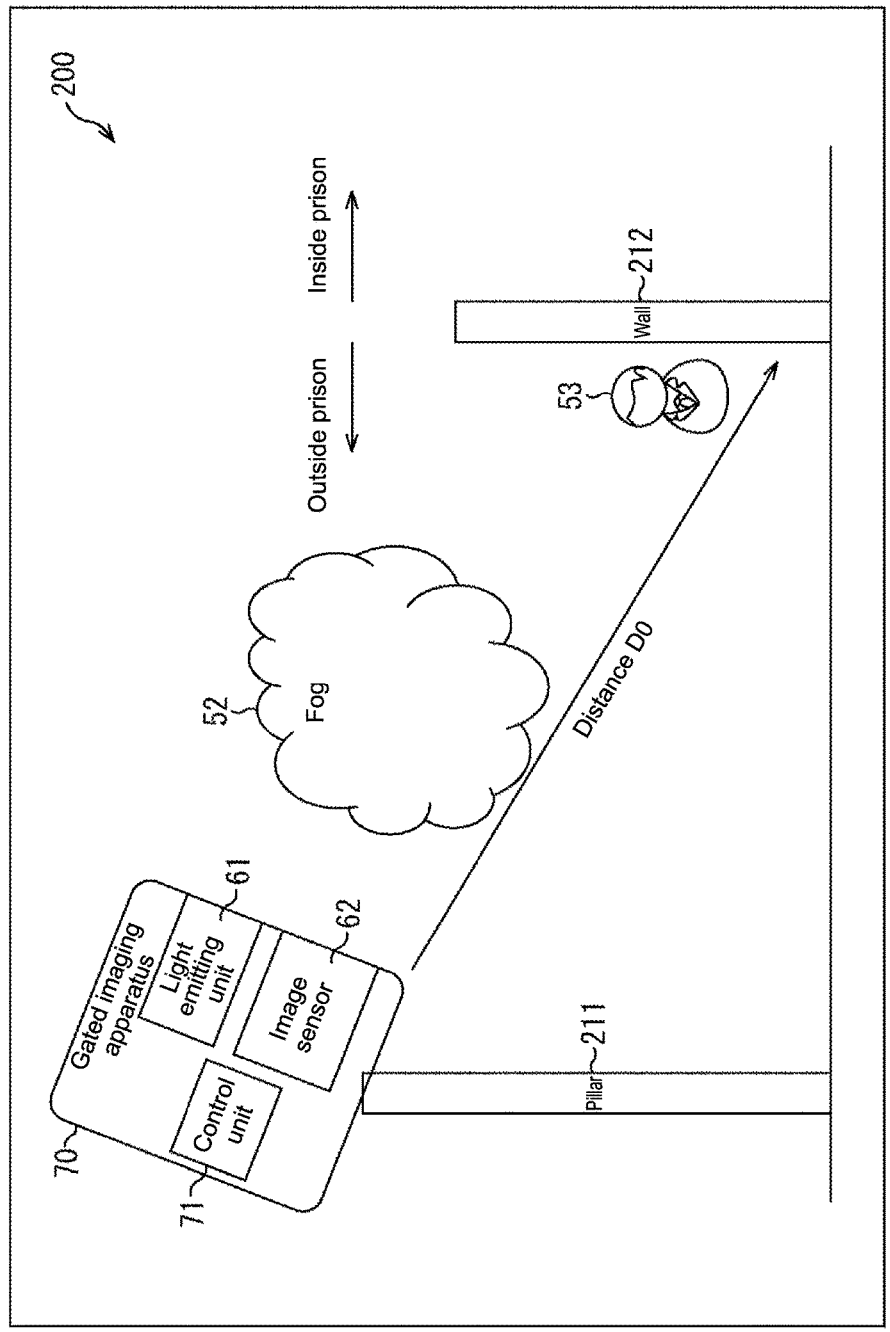
FIG. 14 is a diagram describing a specific example of use of the second embodiment of the present technology.

In a gated imaging system 200 shown in FIG. 14, a usage example for monitoring a prison is described. The inside of the prison and the outside of the prison are separated by a wall 212. The gated imaging apparatus 70 is installed at a position away from the wall 212 to the outside by the distance D0, and perform imaging in the direction of the wall 212.

Favorably, the gated imaging apparatus 70 may be installed on a pillar 211 or the like so that the entire wall 212 can be seen from the gated imaging apparatus 70. In the gated imaging system 200 configured as described above, the gated imaging processing described above with reference to FIG. 12 and FIG. 13 is executed. In the case where there is someone (subject 53 shown in FIG. 14) who climbs over the wall 212 from the inside and escapes to the outside and even in the case where there is the fog 52, it is possible to acquire a sharp projected image of the subject 53.

Further, in the gated imaging system 200, even in the case where the subject 53 has moved, it is possible to continue to perform the gated imaging processing by appropriately following the distance to the subject 53. This is because the contrast of a projected part of the subject 53 becomes higher from the moment when the subject 53 has climbed over the wall 212 and the gated imaging is continued to be performed by following the distance for the higher contrast. In this way, in the gated imaging system 200, it is possible to monitor the desertion.

3. Third Embodiment

<Configuration of Gated Imaging System>

Figure 15:
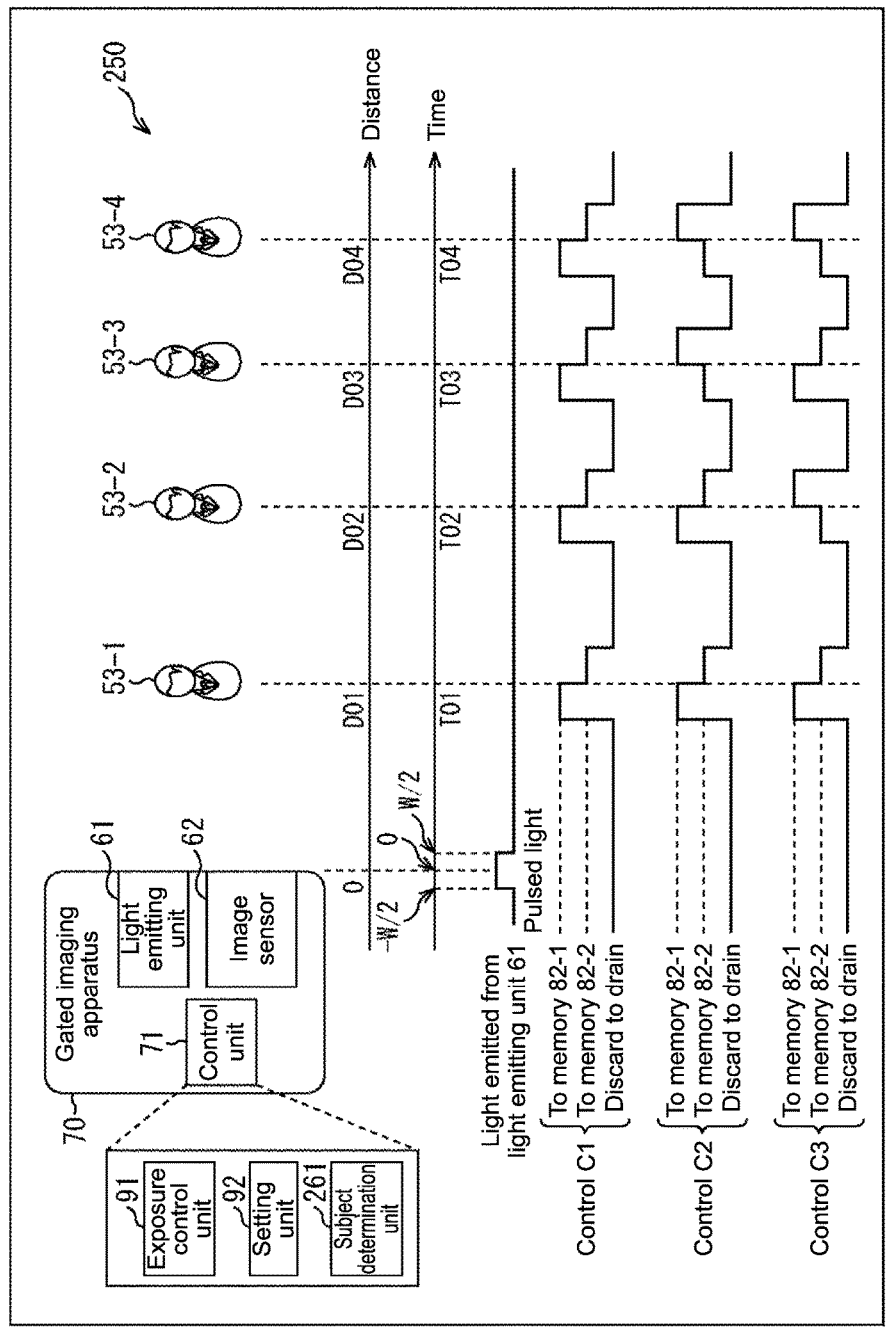
FIG. 15 is a diagram showing a configuration example of a third embodiment of the gated imaging system to which the present technology is applied.

FIG. 15 is a diagram showing a configuration example of a third embodiment of the gated imaging system to which the present technology is applied.

A gated imaging system 250 shown in FIG. 15 is different from the gated imaging system 150 shown in FIG. 10 in that the control unit 71 includes a subject determination unit 261 instead of the subject determination unit 161. The subject determination unit 261 determines (identifies) whether a subject in what distance has moved forward or backward by determining (identifying) in which memory the data of a projected image of the subject is (or is not).

In the example shown in FIG. 15, the gated imaging is performed three times, and light (charges) exposed (received) by the PD 81 is accumulated in the memory 82-1 or 82-2 or discarded to the drain at appropriate timing.

That is, the gated imaging is performed by a control method of control C1 shown in the figure, the gated imaging is performed by a control method of control C2 shown in the figure, and the gated imaging is performed by a control method of control C3 shown in the figure. In this way, the gated imaging is performed three times in total. From an image group acquired by performing the gated imaging three times in total, whether a subject in what distance has moved forward or backward is determined by the subject determination unit 261, and parameters (T01 to T04 to be described later) for the next three times of gated imaging are updated by the setting unit 92.

Note that although assumption is made that the gated imaging is performed temporally three times in the following description, for example, in the case where the resolution in the spatial direction may be sacrificed, the gated imaging may be performed by a control method of the control C1 in the multiples-of-three line of the image sensor 62, the gated imaging may be performed by a control method of the control C2 in the multiples-of-three-with-a-remainder-of-one line of the image sensor 62, and the gated imaging may be performed by a control method of the control C3 in the multiples-of-three-with-a-remainder-of-two line of the image sensor 62. In this way, although the resolution is reduced to ⅓, it is possible to acquire all images of the gated imaging of the control C1 to the control C3 by one gated imaging.

In the example shown in FIG. 15, an example of the gated imaging for sharply imaging four subjects (subjects 53-1 to 53-4) is shown. Note that even in the case where the subject has moved, it is possible to sharply perform imaging even in the next gated imaging by following the subject.

On the assumption that the distance to the subject 53-I (i=1 to 4) is D0$i$, the time when the pulsed light is reflected on the subject 53-$i$ and returned from the subject 53-$i$ is T0$i$=2×D0$i$/c. The width of the pulsed light is represented by W. That is, assumption is made that the pulsed light is emitted for the time period from the time −W/2 to the time W/2. Further, T1$i$=T0$i$−W and T2$i$=T0$i$+W.

First, in the first gated imaging, as shown in FIG. 16A, imaging is performed by the method of the control 1. That is, light (charges) exposed by the PD (light-receiving device) 81 is accumulated in the memory 82-1 during the times T11 and T01. Light (charges) exposed by the PD (light-receiving device) 81 is accumulated in the memory 82-2 during the times T01 and T21.

Light (charges) exposed by the PD (light-receiving device) 81 is accumulated in the memory 82-1 during the times T12 and T02. Light (charges) exposed by the PD (light-receiving device) 81 is accumulated in the memory 82-2 during the times T02 and T22.

Light (charges) exposed by the PD (light-receiving device) 81 is accumulated in the memory 82-1 during the times T13 and T03. Light (charges) exposed by the PD (light-receiving device) 81 is accumulated in the memory 82-2 during the times T03 and T23. Light (charges) exposed by the PD (light-receiving device) 81 is accumulated in the memory 82-1 during the times T14 and T04. Light (charges) exposed by the PD (light-receiving device) 81 is accumulated in the memory 82-2 during the times T04 and T24.

Control is performed so that it is discharged to the drain during the other times.

In the second gated imaging, as shown in FIG. 16B, imaging is performed by the method of the control C2. That is, light (charges) exposed by the PD (light-receiving device) 81 is accumulated in the memory 82-1 during the times T11 and T01. Light (charges) exposed by the PD (light-receiving device) 81 is accumulated in the memory 82-2 during the times T01 and T21.

Light (charges) exposed by the PD (light-receiving device) 81 is accumulated in the memory 82-1 during the times T12 and T02. Light (charges) exposed by the PD (light-receiving device) 81 is accumulated in the memory 82-2 during the times T02 and T22.

Light (charges) exposed by the PD (light-receiving device) 81 is accumulated in the memory 82-2 during the times T13 and T03. Light (charges) exposed by the PD (light-receiving device) 81 is accumulated in the memory 82-1 during the times T03 and T23. Light (charges) exposed by the PD (light-receiving device) 81 is accumulated in the memory 82-2 during the times T14 and T04. Light (charges) exposed by the PD (light-receiving device) 81 is accumulated in the memory 82-1 during the times T04 and T24.

In the third gated imaging, as shown in FIG. 16C, imaging is performed by the method of the control C3. That is, light (charges) exposed by the PD (light-receiving device) 81 is accumulated in the memory 82-1 during the times T11 and T01. Light (charges) exposed by the PD (light-receiving device) 81 is accumulated in the memory 82-2 during the times T01 and T21.

Light (charges) exposed by the PD (light-receiving device) 81 is accumulated in the memory 82-2 during the times T12 and T02. Light (charges) exposed by the PD (light-receiving device) 81 is accumulated in the memory 82-1 during the times T02 and T22.

Light (charges) exposed by the PD (light-receiving device) 81 is accumulated in the memory 82-1 during the times T13 and T03. Light (charges) exposed by the PD (light-receiving device) 81 is accumulated in the memory 82-2 during the times T03 and T23. Light (charges) exposed by the PD (light-receiving device) 81 is accumulated in the memory 82-2 during the times T14 and T04. Light (charges) exposed by the PD (light-receiving device) 81 is accumulated in the memory 82-1 during the times T04 and T24.

In the j-th (j=1 to 3) gated imaging, after the time T24, charges accumulated in the memory 82-1 of each pixel 2 of the image sensor 62 are read, and a resulting image I1$j$ of the gated imaging is obtained from the value of the read pixel. Then, charges accumulated in the memory 82-2 of each pixel 2 of the image sensor 63 are read, and a resulting image I2$j$ of the gated imaging is obtained from the value of the read pixel.

In the resulting image I1$j$ and the resulting image I2$j$, projected images of the subjects 53-1 to 53-4 is picked up. Note that in order to make it easy to see, an image obtained by adding the resulting image I1$j$ and the resulting image I2$j$ may be created to obtain a sharp image of the subjects 53-1 to 53-4.

Now, when the control 1 to the control C3 are compared with each other, whether it is accumulated in the memory 82-1 or the memory 82-2 during the time between the times T1$i$ and T0$i$ and during the times T0$i$ to T2$i$ (i=1 to 4) is different. Assumption is made that the case where it is accumulated in the memory 82-1 during the times T1$i$ and T0$i$ and it is accumulated in the memory 82-2 during the time between the times T0$i$ and T2$i$ is a pattern 0. Then, assumption is made that the case where it is accumulated in the memory 82-2 during the times T1$i$ and T0$i$ and it is accumulated in the memory 82-1 during the time between the times T0$i$ and T2$i$ is a pattern 0. By defining the pattern 0 and the pattern 1 as described above, the control shown in FIGS. 16A, 16B, and 16C is as shown in FIG. 17.

As is clear from the combination of the pattern 0/1 shown in FIG. 17, it can be considered that a code of three bits is assigned to each of the subjects 53-1 to 53-4. That is, in the imaging for the subject 53-1, {the case of the control C1, the case of the control C2, and the case of the control C3}={0,0,0}.

In the imaging for the subject 53-2, {the case of the control C1, the case of the control C2, and the case of the control C3}={0,0,1}. In the imaging for the subject 53-3, {the case of the control C1, the case of the control C2, and the case of the control C3}={0,1,0}. In the imaging for the subject 53-4, {the case of the control C1, the case of the control C2, and the case of the control C3}={0,1,1}.

These patterns of three bits are different for the four subjects. By differently setting as described above, it is possible to determine which subject has moved.

Further, a total of eight patterns of three bits including three bits={1,1,1} obtained by bit-inverting {the case of the control C1, the case of the control C2, and the case of the control C3} for the subject 53-1, three bits={1,1,0} obtained by bit-inverting {the case of the control C1, the case of the control C2, and the case of the control C3} for the subject 53-2, three bits={1,0,1} obtained by bit-inverting {the case of the control C1, the case of the control C2, and the case of the control C3} for the subject 53-3, and three bits={1,0,0} obtained by bit-inverting {the case of the control C1, the case of the control C2, and the case of the control C3} for the subject 53-4 differ. Accordingly, it is possible to determine also whether the subject has moved forward or backward. Such assignment of the patterns is an important point of the third embodiment of the present technology.

Figure 18:
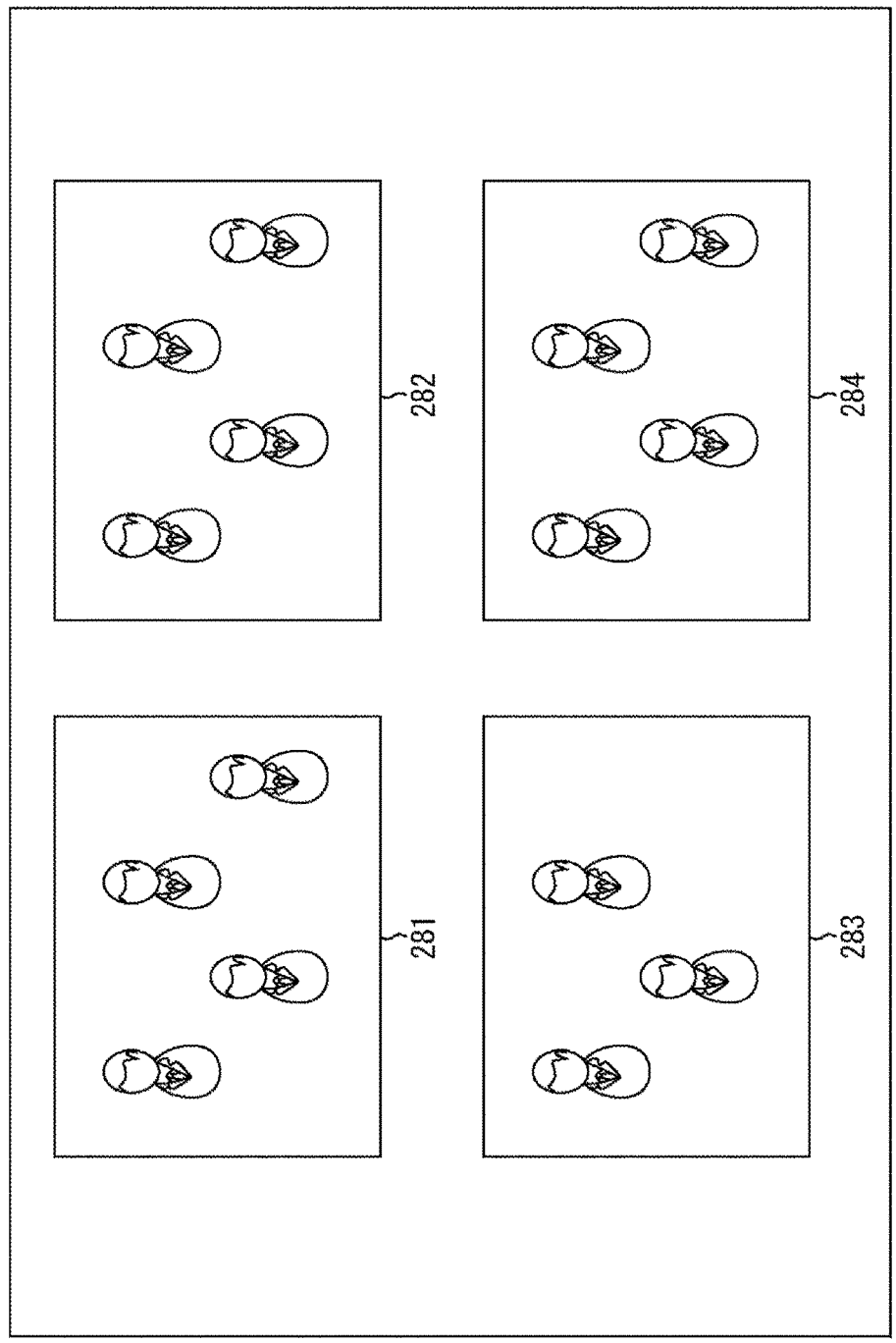
FIG. 18 is a diagram describing an important point of the third embodiment of the present technology in detail.

This will be described in more detail with reference to FIG. 18.

Assumption is made that only the gated imaging by the control C1 is performed. In such gated imaging, an image 281 is read from the memory 82-1, and an image 282 is read from the memory 82-2. In the respective images, four projected images of the subjects 53-1 to 53-4 are imaged. Note that the correspondence relationship between the four projected images of the images 281 and 282 and the subjects 53-1 to 53-4 is unknown.

Next, assumption is made that the gated imaging by the control C1 is performed again. Assumption is made that at this time, any one of the subjects 53-1 to 53-4 has moved backward. As described above in the second embodiment of the present technology, the projected image of the subject that has moved backward is not projected in an image 283 read from the memory 82-1. Meanwhile, it is projected in an image 284 read from the memory 82-2.

Therefore, it can be seen that any of the four subjects 53-1 to 53-4 has moved backward. However, which subject has moved backward cannot be identified. Although it only needs to delay the exposure timing by following the moved subject, which of T01 to T04 needs to be delayed is unknown.

Specifically, for example, it may be possibly considered that T03 only needs to be delayed because a subject at a distance D03 has moved backward and the image 283 and the image 284 are obtained, but this is wrong. This is because the moved subject may be a subject not at the distance D03 but at a distance D04.

Description will be made again. Since the lower right projected image disappears (is not picked up) in the image 283, it can be seen that the subject corresponding to the lower right projected image has moved. However, at which distance (which of the distances D01 to D04) this subject has been originally is unknown. Therefore, which of T01 to T04 needs to be delayed is unknown.

Figure 19:
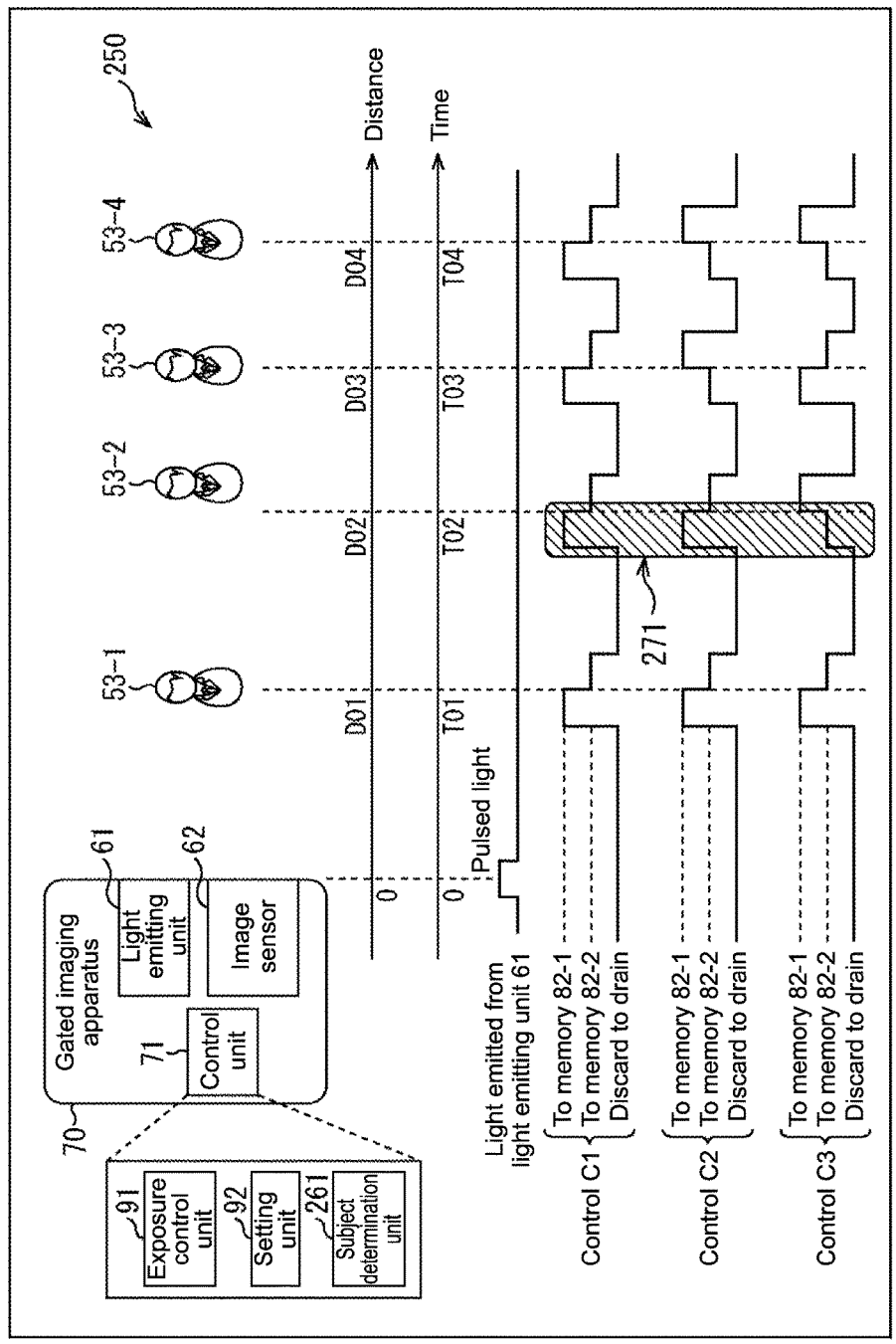
FIG. 19 is a diagram describing a method of identifying a moved subject.

Meanwhile, by performing the gated imaging three times (imaging by the control C1 to the control C3), it is possible to identify which of T01 to T04 is. For example, assumption is made that in the example shown in FIG. 15, the subject at the distance D02 (T02 in terms of time) (that is, the subject 53-2) has moved forward as shown in FIG. 19. Since there is not subject 53-2 in the time of a shaded area 271 shown in FIG. 19, the reflected light is not returned. Therefore, in an image read from the memory 82-1 by the gated imaging by the control C1, the subject is not imaged. Then, in an image read from the memory 82-1 by the gated imaging by the control C2, the subject is not imaged. Then, in an image read from the memory 82-2 by the gated imaging by the control C3, the subject is not imaged. In other images, the subject is imaged.

Conversely, in the case where it is not imaged in the image read from the memory 82-1 by the gated imaging by the control C1, the image read from the memory 82-1 by the gated imaging by the control C2, and the image read from the memory 82-2 by the gated imaging by the control C3, and imaged in other images, it represents that the subject that has been at the distance D02 has moved backward, and it is possible to sharply image a total of four subjects including other three subjects by delaying T02 by a small time period in the next gated imaging.

Including also other cases, by resetting T0$i$ (i=1 to 4) as shown in FIG. 20 and FIG. 21, it is possible to sharply image the four subjects also in the next gated imaging.

The example shown in FIG. 20 will be described in the order from the top. In the case where there is a subject that is not imaged in an image I11 read from the memory 82-1 in the gated imaging by the control C1, is imaged in an image I12 read from the memory 82-2 in the gated imaging by the control C1, is not imaged in an image I21 read from the memory 82-1 in the gated imaging by the control C2, is imaged in an image I22 read from the memory 82-1 in the gated imaging by the control C2, is not imaged in an image I13 read from the memory 82-1 in the gated imaging by the control C3, and is imaged in an image I23 read from the memory 82-1 in the gated imaging by the control C3, the setting unit 92 delays the T01 by a small time period in the next imaging.

In the case where there is a subject that is imaged in the image I11 read from the memory 82-1 in the gated imaging by the control C1, is not imaged in the image I12 read from the memory 82-2 in the gated imaging by the control C1, is imaged in the image I21 read from the memory 82-1 in the gated imaging by the control C2, is not imaged in the image I22 read from the memory 82-1 in the gated imaging by the control C2, is imaged in the image I13 read from the memory 82-1 in the gated imaging by the control C3, and is not imaged in the image I23 read from the memory 82-1 in the gated imaging by the control C3, the setting unit 92 advances the T01 by a small time period in the next imaging.

In the case where there is a subject that is not imaged in the image I11 read from the memory 82-1 in the gated imaging by the control C1, is imaged in the image I12 read from the memory 82-2 in the gated imaging by the control C1, is not imaged in the image I21 read from the memory 82-1 in the gated imaging by the control C2, is imaged in the image I22 read from the memory 82-1 in the gated imaging by the control C2, is imaged in the image I13 read from the memory 82-1 in the gated imaging by the control C3, and is not imaged in the image I23 read from the memory 82-1 in the gated imaging by the control C3, the setting unit 92 delays the T02 by a small time period in the next imaging.

In the case where there is a subject that is imaged in the image I11 read from the memory 82-1 in the gated imaging by the control C1, is not imaged in the image I12 read from the memory 82-2 in the gated imaging by the control C1, is imaged in the image I21 read from the memory 82-1 in the gated imaging by the control C2, is not imaged in the image I22 read from the memory 82-1 in the gated imaging by the control C2, is not imaged in the image I13 read from the memory 82-1 in the gated imaging by the control C3, and is imaged in the image I23 read from the memory 82-1 in the gated imaging by the control C3, the setting unit 92 advances the T02 by a small time period in the next imaging.

Further, the example shown in FIG. 21 will be described in the order from the top. In the case where there is a subject that is not imaged in the image I11 read from the memory 82-1 in the gated imaging by the control C1, is imaged in the image I12 read from the memory 82-2 in the gated imaging by the control C1, is imaged in the image I21 read from the memory 82-1 in the gated imaging by the control C2, is not imaged in the image I22 read from the memory 82-1 in the gated imaging by the control C2, is not imaged in the image I13 read from the memory 82-1 in the gated imaging by the control C3, and is imaged in the image I23 read from the memory 82-1 in the gated imaging by the control C3, the setting unit 92 delays the T03 by a small time period in the next imaging.

In the case where there is a subject that is imaged in the image I11 read from the memory 82-1 in the gated imaging by the control C1, is not imaged in the image I12 read from the memory 82-2 in the gated imaging by the control C1, is not imaged in the image I21 read from the memory 82-1 in the gated imaging by the control C2, is imaged in the image I22 read from the memory 82-1 in the gated imaging by the control C2, is imaged in the image I13 read from the memory 82-1 in the gated imaging by the control C3, and is not imaged in the image I23 read from the memory 82-1 in the gated imaging by the control C3, the setting unit 92 advances the T03 by a small time period in the next imaging.

In the case where there is a subject that is not imaged in the image I11 read from the memory 82-1 in the gated imaging by the control C1, is imaged in the image I12 read from the memory 82-2 in the gated imaging by the control C1, is imaged in the image I21 read from the memory 82-1 in the gated imaging by the control C2, is not imaged in the image I22 read from the memory 82-1 in the gated imaging by the control C2, is imaged in the image I13 read from the memory 82-1 in the gated imaging by the control C3, and is not imaged in the image I23 read from the memory 82-1 in the gated imaging by the control C3, the setting unit 92 delays the T04 by a small time period in the next imaging.

In the case where there is a subject that is imaged in the image I11 read from the memory 82-1 in the gated imaging by the control C1, is not imaged in the image I12 read from the memory 82-2 in the gated imaging by the control C1, is not imaged in the image I21 read from the memory 82-1 in the gated imaging by the control C2, is imaged in the image I22 read from the memory 82-1 in the gated imaging by the control C2, is not imaged in the image I13 read from the memory 82-1 in the gated imaging by the control C3, and is imaged in the image I23 read from the memory 82-1 in the gated imaging by the control C3, the setting unit 92 advances the T04 by a small time period in the next imaging.

As described above, according to the third embodiment of the present technology, even in the case where a plurality of subjects move in the depth direction, it is possible to achieve the gated imaging that is capable of continuing to sharply image the subjects by appropriately following the subjects. Note that it is different from the second embodiment of the present technology in that it supports a plurality of subjects.

<Operation of Gated Imaging System>

Figure 22:
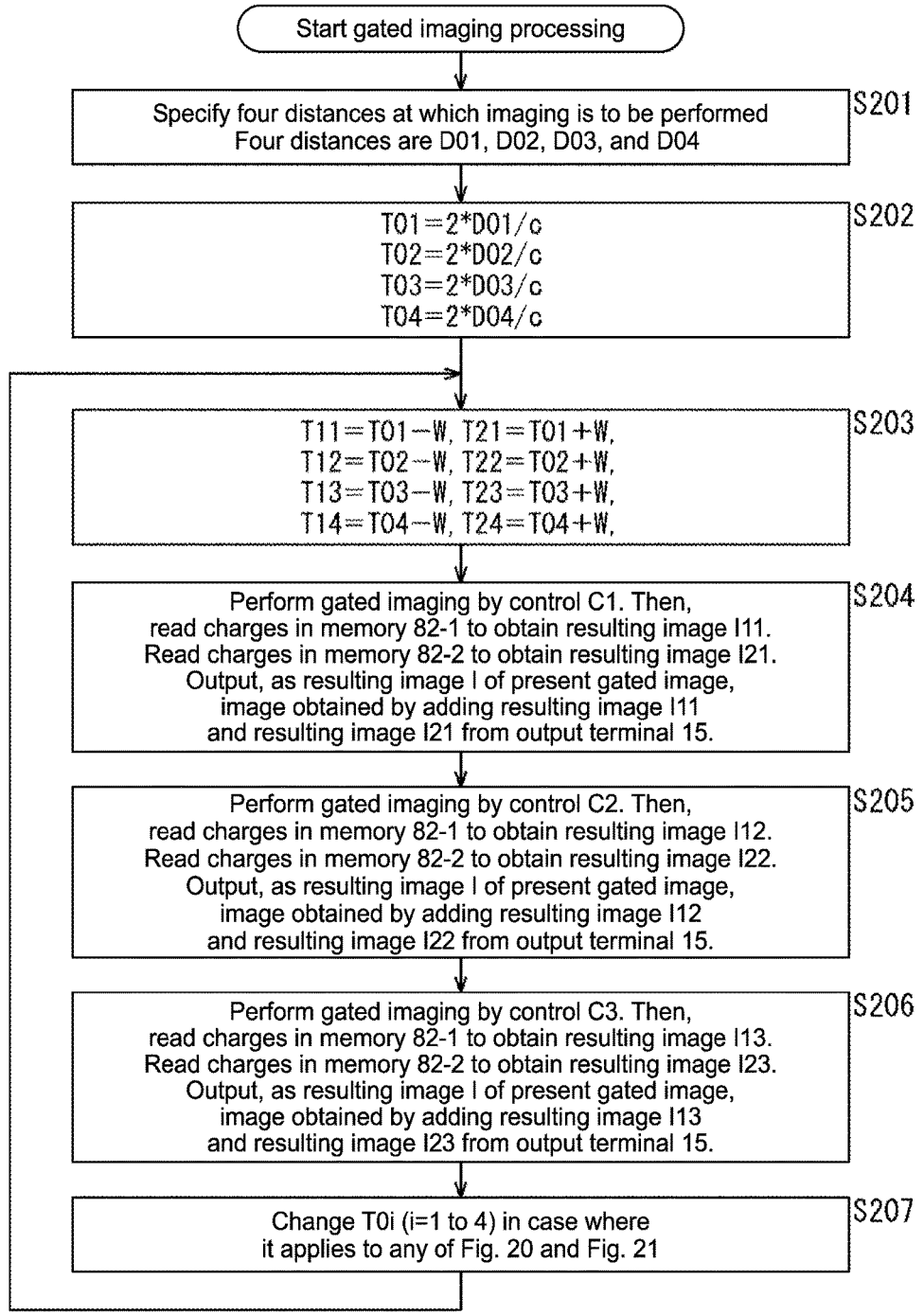
FIG. 22 is a flowchart describing the gated imaging processing by the gated imaging system shown in FIG. 15.

Next, the gated imaging processing by the gated imaging system 250 shown in FIG. 15 and FIG. 19 will be described with reference to the flowchart of FIG. 22.

In Step S201, the setting unit 92 specifies four distances at which imaging is to be performed. In this example, the four distances are D01, D02, D03, and D04.

The setting unit 92 sets $T01=2*D01/c$, $T02=2*D02/c$, $T03=2*D03/c$, and $T04=2*D04/c$, (c representing a speed of light) in Step S202, and $T11=T01-W$, $T21=T01+W$, $T12=T02-W$, $T22=T02+W$, $T13=T03-W$, $T23=T03+W$, $T14=T04-W$, and $T24=T04+W$ (where W represents the width of pulsed light) in Step S205.

In Step S204, the exposure control unit 91 performs gated imaging by the control C1, reads charges in the memory 82-1 to obtain a resulting image I11, and reads charges in the memory 82-2 to obtain a resulting image I21. Then, the exposure control unit 91 outputs, as a resulting image I of the present gated image, an image obtained by adding the resulting image I11 and the resulting image I21 from the output terminal 72.

In Step S205, the exposure control unit 91 performs gated imaging by the control C2, reads charges in the memory 82-1 to obtain a resulting image I12, and reads charges in the memory 82-2 to obtain a resulting image I22. Then, the exposure control unit 91 outputs, as a resulting image I of the present gated image, an image obtained by adding the resulting image I12 and the resulting image I22 from the output terminal 72.

In Step S206, the exposure control unit 91 performs gated imaging by the control C3, reads charges in the memory 82-1 to obtain a resulting image I13, and reads charges in the memory 82-2 to obtain a resulting image I23. Then, the exposure control unit 91 outputs, as a resulting image I of the present gated image, an image obtained by adding the resulting image I13 and the resulting image I23 from the output terminal 72.

In Step S207, the setting unit 92 changes $T0i$ (i=1 to 4) in the case where it applies to any of the tables shown in FIG. 20 and FIG. 21.

After that, the processing returns to Step S203, and the subsequent processing is repeated.

Note that the case where the number of subjects is four has been described above. In this case, it needs three bits to distinguish between the four subjects and between the forward movement and the backward movement. In order to achieve this, three times of gated imaging by the control C1 to the control C3 has been performed. Generalizing the number of subjects (number of distances at which subjects to be imaged are) is as follows. That is, in order to perform the gated imaging on (2 to the s-th power) subjects, s+1 times of gated imaging is performed. In each of the s+1 times of gated imaging, in which of the memory 82-1 and the memory 82-2 the first half and the latter half of reflection of pulsed light is accumulated only needs to be different for the pattern of s+1 bits including the bit inversion.

4. Fourth Embodiment

In the above-mentioned first to third embodiments of the present technology, assumption is made that when performing the first gated imaging, the distance of the subject is already known. However, in actual operation, the distance of the subject is unknown at first in most cases.

In this regard, in a fourth embodiment, a method of determining a distance of a subject in a short time in the case where the distance of the subject is unknown will be described. That is, it is possible to embody the best of the present technology by identifying the distance of the subject with the fourth embodiment of the present technology and then executing the first to third embodiments of the present technology.

Next, the gated imaging processing in the case of the fourth embodiment will be described with reference to the flowchart of FIG. 23. Note that description will be made using the gated imaging apparatus 250 described above with reference to FIG. 15 and FIG. 19.

In Step S301, the setting unit 92 sets a maximum imaging range Dmin to Dmax. Note that Dmin<Dmax.

In Step S302, the setting unit 92 sets $Tmin=2*Dmin/c$ and $Tmax=2*Dmax/c$.

In Step S303, the setting unit 92 performs the processing of sub-routine A, and then, finishes the gated imaging processing. Subsequently, the processing of sub-routine A in Step S303 will be described with reference to FIG. 24 to FIG. 26.

Figure 24:
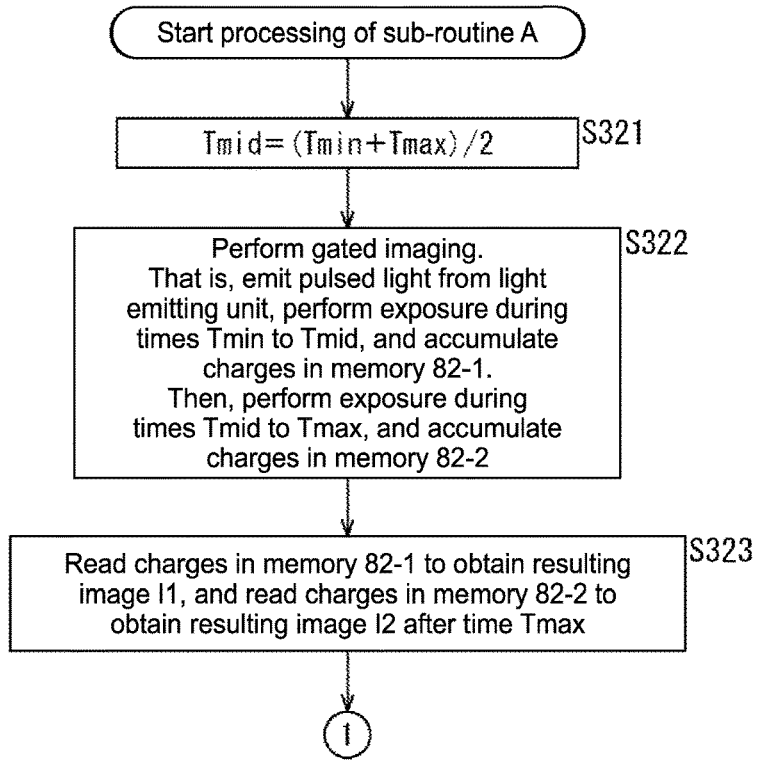
FIG. 24 is a flowchart describing processing of sub-routine A in Step S303 shown in FIG. 23.
Figure 25:
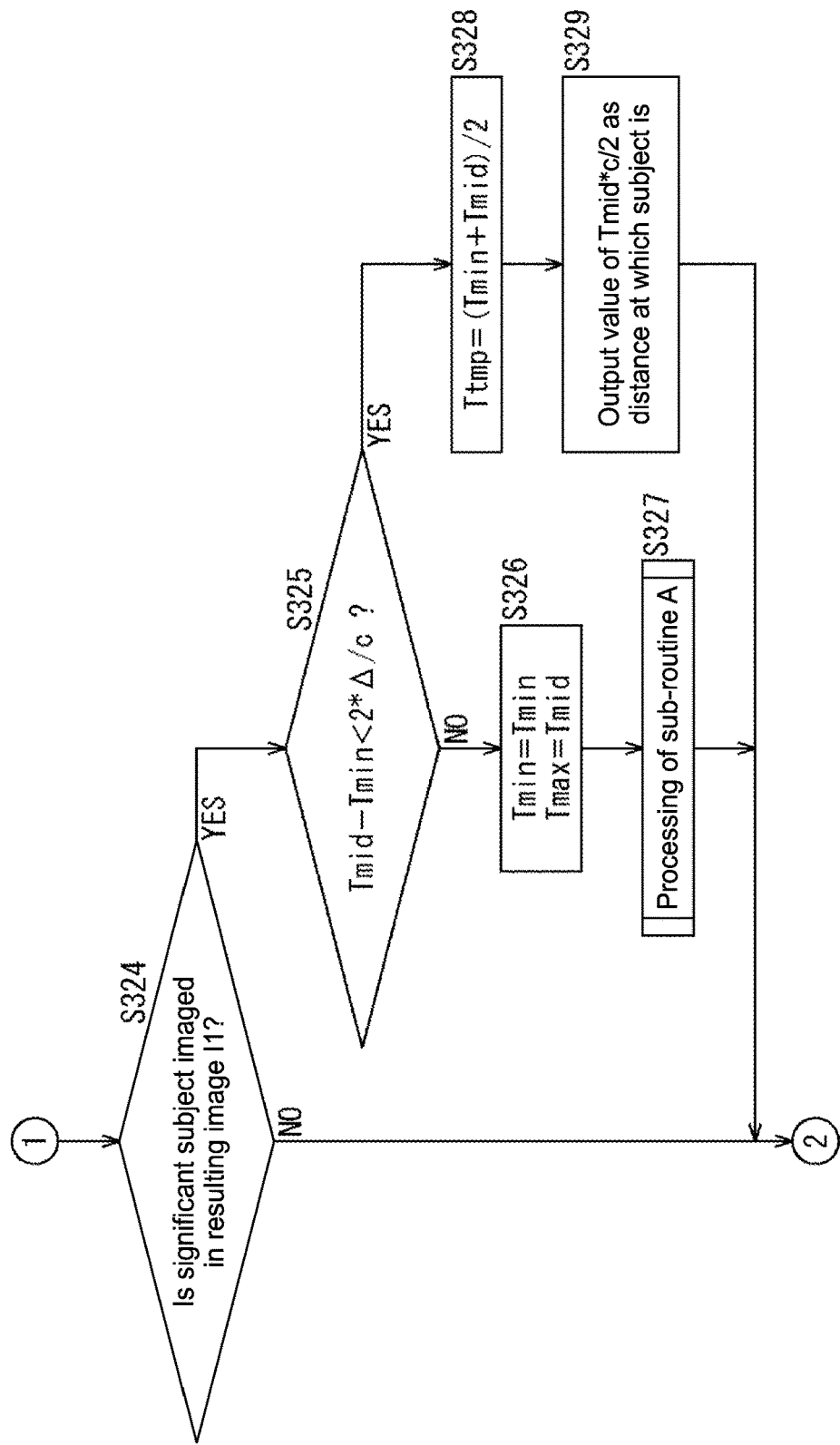
FIG. 25 is a flowchart describing the processing of the sub-routine A in Step S303 shown in FIG. 23.

In Step S321 shown in FIG. 24, the setting unit 92 sets Tmid=(Tmin+Tmax)/2. In Step S322, the exposure control unit 91 performs gated imaging. That is, the exposure control unit 91 emits pulsed light from the light emitting unit 61, and accumulates light (charges) received (exposed) by the PD (light-receiving device) 81 in the memory 82-1 during times Tmin to Tmid. During times Tmid to Tmax, the exposure control unit 91 accumulates light (charges) received (exposed) by the PD (light-receiving device) 81 in the memory 82-2. During the other times, light (charges) received (exposed) by the PD (light-receiving device) 81 is discharged to the drain.

In Step S323, the exposure control unit 91 reads charges accumulated in the memory 82-1 of each pixel 2 of the image sensor 62 after the time Tmax, and obtains the resulting image I1 of the gated imaging from the value of the read pixel. Further, the exposure control unit 91 reads charges accumulated in the memory 82-2 of each pixel 2 of the image sensor 62, and obtains the resulting image I2 of the gated imaging from the value of the read pixel.

In Step S324, the subject determination unit 261 determines whether or not a significant subject is imaged in the resulting image I1. In the case where it is determined in Step S324 that a significant subject is imaged in the resulting image I1, the processing proceeds to Step S325.

In Step S325, the setting unit 92 determines whether or not Tmid−Tmin<2*Δ/c. Note that Δ represents the accuracy of the distance to be specified. In the case where it is determined in Step S325 that Tmid−Tmin is not less than 2*Δ/c, the processing proceeds to Step S326. The setting unit 92 sets Tmin=Tmin and Tmax=Tmid in Step S326, and performs the processing of sub-routine A (processing being described at the present) again in Step S327.

Further, in the case where it is determined in Step S325 that Tmid−Tmin<2*Δ/c, the processing proceeds to Step S328. The setting unit 92 sets Ttmp=(Tmin+Tmid)/2 in Step S328, and outputs a value of Tmid*c/2 as the distance at which the subject 53 is in Step S329.

Figure 26:
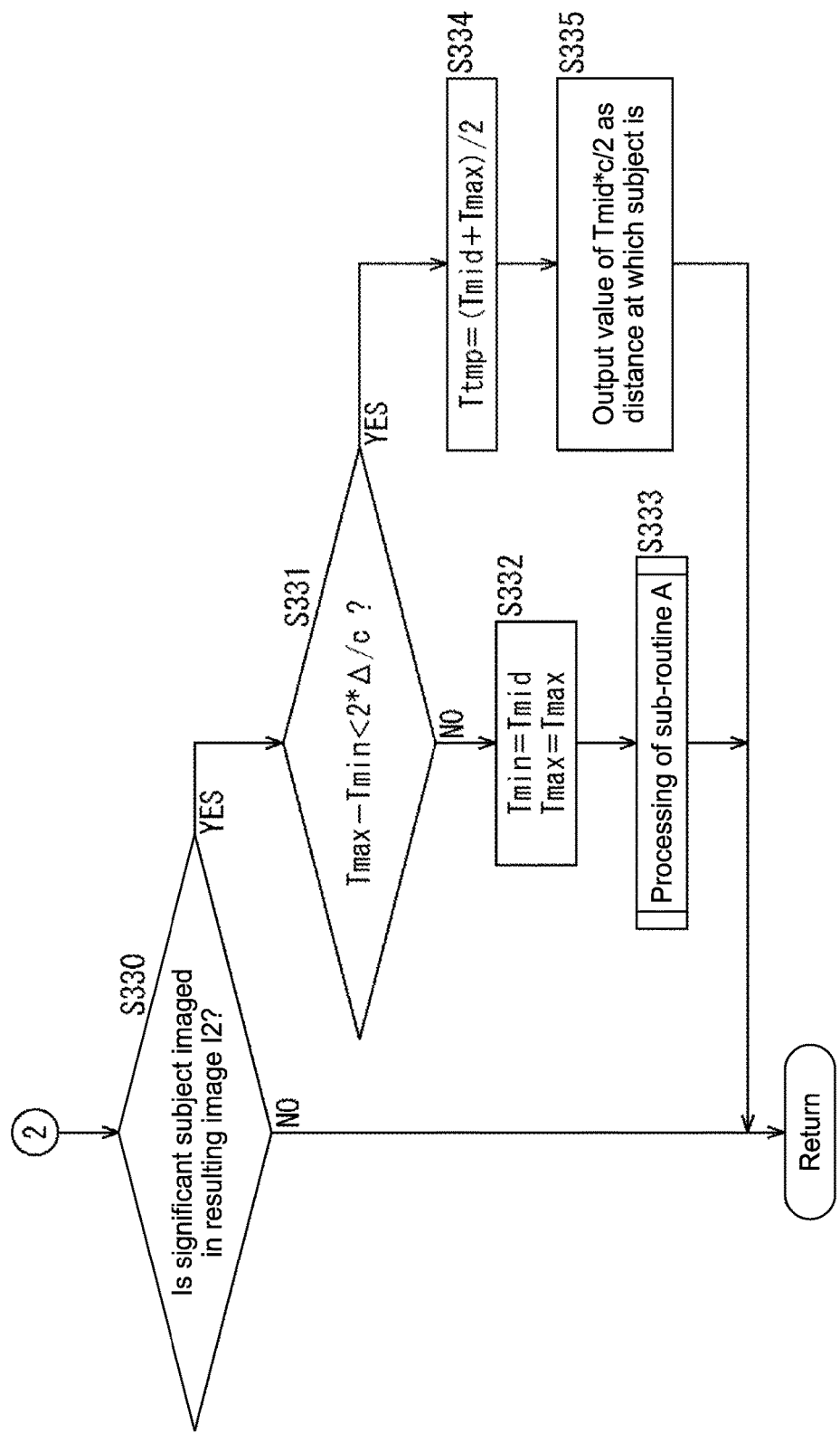
FIG. 26 is a flowchart describing the processing of the sub-routine A in Step S303 shown in FIG. 23.

After Step S327 or Step S329, the processing proceeds to S330 shown in FIG. 26. Meanwhile, in the case where it is determined in Step S324 that a significant subject is not imaged in the resulting image I1, the processing proceeds to Step S330 shown in FIG. 26.

In Step S330 shown in FIG. 26, the subject determination unit 261 determines whether or not a significant subject is imaged in the resulting image I2. In the case where it is determined in Step S330 that a significant subject is imaged in the resulting image I2, the processing proceeds to Step S331.

In Step S331, the setting unit 92 determines whether or not Tmax−Tmin<2*Δ/c. Note that Δ represents the accuracy of the distance to be specified. In the case where it is determined in Step S331 that Tmax−Tmin is not less than 2*Δ/c, the processing proceeds to Step S332. The setting unit 92 sets Tmin=Tmid and Tmax=Tmax in Step S332, and performs the processing of sub-routine A (processing being described at the present) again in Step S333.

Further, in the case where it is determined in Step S331 that Tmax−Tmin<2*Δ/c, the processing proceeds to Step S334. The setting unit 92 sets Ttmp=(Tmin+Tmax)/2 in Step S334, and outputs a value of Tmid*c/2 as the distance at which the subject 53 is in Step S335.

Figure 23:
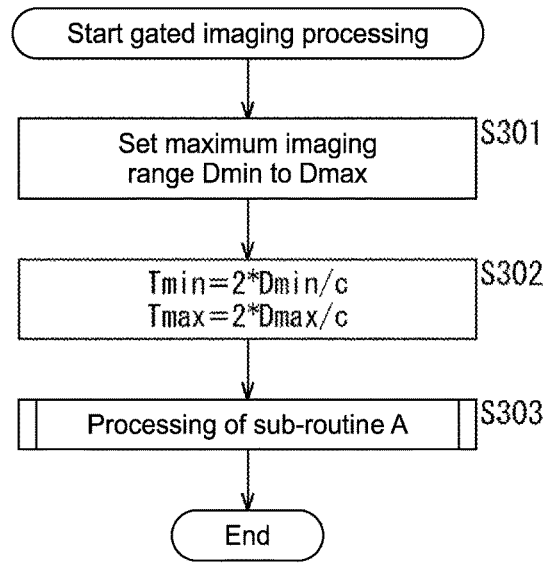
FIG. 23 is a flowchart describing the gated imaging processing by the gated imaging system in the case of a fourth embodiment of the present technology.

After Step S333 or Step S335, the processing returns to S303 shown in FIG. 23, and the gated imaging processing is finished. Meanwhile, in the case where it is determined in Step S330 that a significant subject is not imaged in the resulting image 2, the processing returns to S303 shown in FIG. 23 and the gated imaging processing is finished.

Note that description has been made in the above on the assumption that one pixel has the configuration shown in FIG. 6. That is, light exposed (received) by the PD (light-receiving device) 81 is converted into charges, and the charges are accumulated in the memory (charge accumulation unit) 82. Meanwhile, in the case where there are m (m representing an integer not less than 3) memories, the configuration is as follows.

That is, light exposed by the PD 81 is converted into charges, and the charges are accumulated in any of the memories 82-$k$ (k=1 to m). In this case, it only needs to narrow the search range by dividing the imaging range not into two ranges unlike the above example but into m ranges.

As described above, according to the present technology, it is possible to receive light a plurality of times temporally per pulse emission. Accordingly, it is possible to sharply image a plurality of subjects, know the direction of movement of a subject in the depth direction, and continue to image a moving subject by following the moving subject.

Note that although the configuration in which the present technology is applied to the CMOS solid-state imaging apparatus has been described in the above, the present technology may be applied to a solid-state imaging apparatus such as a CCD (Charge Coupled Device) solid-state imaging apparatus.

5. Fifth Embodiment (Usage Example of Image Sensor)

Figure 27:
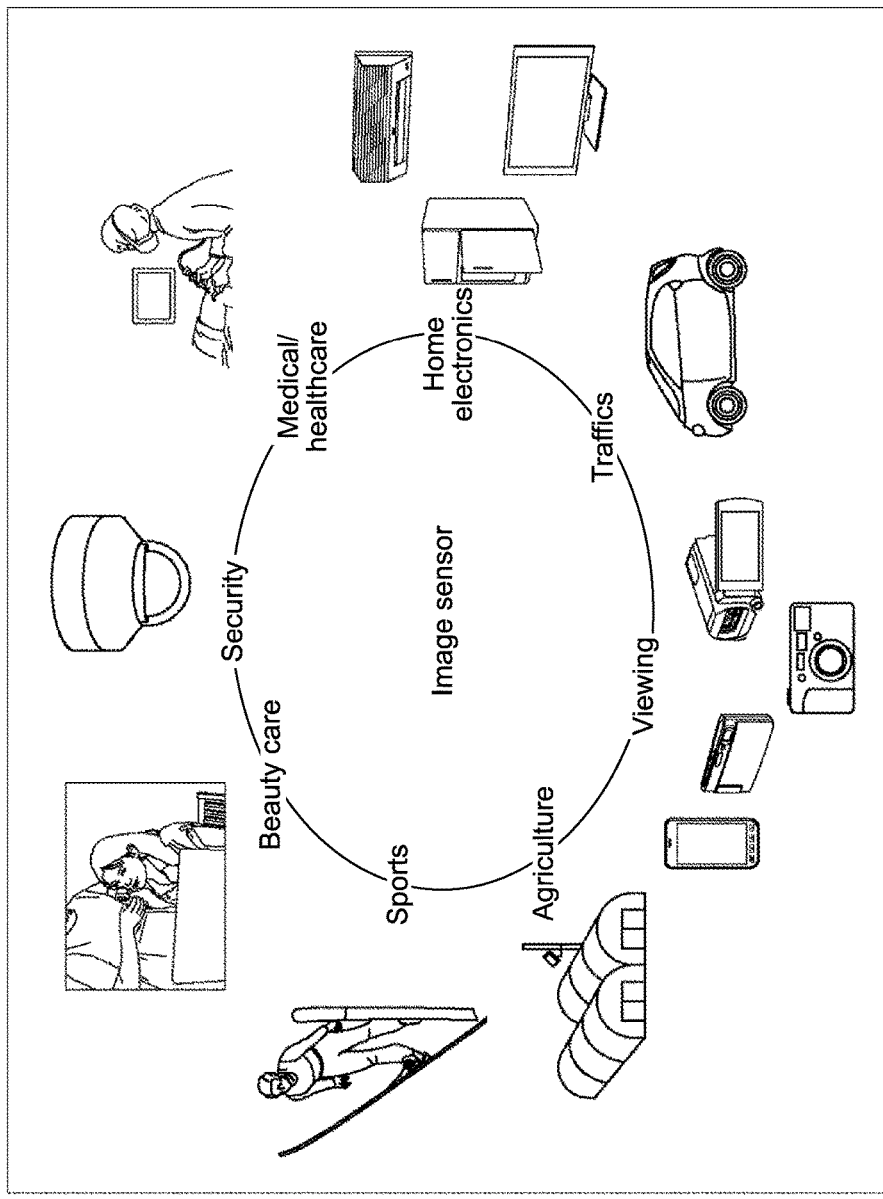
FIG. 27 is a diagram showing a usage example of an image sensor to which the present technology is applied.

FIG. 27 is a diagram showing a usage example of the above-mentioned solid-state imaging apparatus.

The above-mentioned solid-state imaging apparatus (image sensor) can be used in various cases for sensing light such as visible light, infrared light, ultraviolet light, and X-rays as follows, for example.

An apparatus for photographing images to be viewed, such as a digital camera and a camera-equipped mobile apparatus An apparatus used in the traffic field, such as a car-mounted sensor that photographs front/rear/periphery/inside of an automobile, a surveillance camera that monitors running vehicles and roads, and a distance measurement sensor that measures distances among vehicles, for safe driving including automatic stop, recognition of a driver condition, and the like An apparatus used in the home electronics field such as a television receiver, a refrigerator, and an air conditioner, for photographing gestures of users and executing apparatus operations according to the gestures An apparatus used in the medical and healthcare filed, such as an endoscope and an apparatus that performs blood vessel photographing by receiving infrared light An apparatus used in the security field, such as a surveillance camera for crime-prevention purposes and a camera for person authentication purposes An apparatus used in the beauty care field, such as a skin measurement apparatus that photographs skins and a microscope that photographs scalps An apparatus used in the sports field, such as an action camera and a wearable camera for sports purposes An apparatus in the agriculture field, such as a camera for monitoring states of fields and crops

6. Sixth Embodiment (Example of Electronic Apparatus)

<Configuration Example of Electronic Apparatus>

Further, the present technology is not necessarily applied to a solid-state imaging apparatus, and is applicable also to an imaging apparatus. Note that the imaging apparatus represents a camera system such as a digital still camera and a digital video camera, and an electronic apparatus having an imaging function such as a mobile phone. Note that a module-like form mounted on an electronic apparatus, i.e., a camera module is an imaging apparatus in some cases.

Now, a configuration example of an electronic apparatus according to the present technology will be described with reference to FIG. 28.

Figure 28:
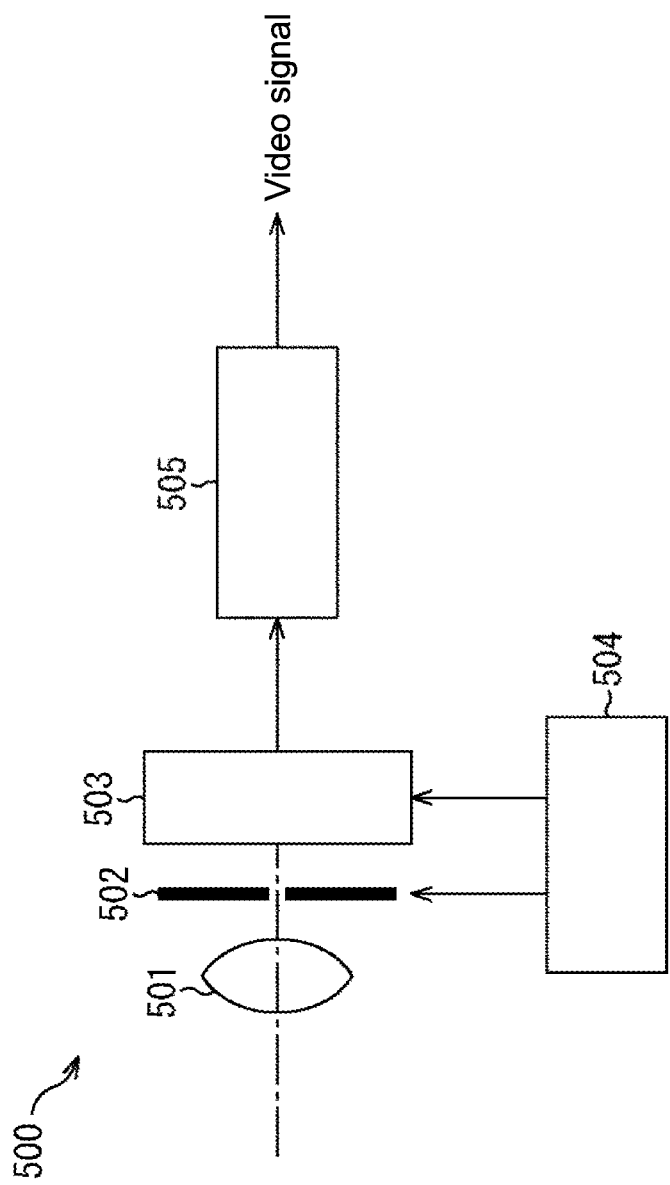
FIG. 28 is a block diagram showing a configuration example of an electronic apparatus to which the present technology is applied.

An electronic apparatus 500 shown in FIG. 28 includes a solid-state imaging apparatus (device chip) 501, an optical lens 502, a shutter apparatus 503, a drive circuit 504, and a signal processing circuit 505. As the solid-state imaging apparatus 501, the above-mentioned solid-state imaging apparatus 1 (image sensor 62) according to the present technology is provided. Further, in the electronic apparatus 500, the above-mentioned light emitting unit 61 is provided as a light emitting unit (not shown).

The optical lens 502 forms an image of image light (incident light) from a subject on the imaging surface of the solid-state imaging apparatus 501. Accordingly, signal charges are accumulated in the solid-state imaging apparatus 501 for a certain period of time. The shutter apparatus 503 controls the light irradiation period of time and light blocking period of time for the solid-state imaging apparatus 501.

The drive circuit 504 supplies drive signals for controlling a signal transfer operation of the solid-state imaging apparatus 501, a shutter operation of the shutter apparatus 503, and a light emission operation of the light emitting unit (not shown). As the drive circuit 504, the above-mentioned exposure control unit 91 according to the present technology is provided. The drive circuit 504 controls each operation by using parameters set by a CPU (not shown). As the CPU (not shown), the above-mentioned setting unit 92 according to the present technology is provided. By the drive signal (timing signal) supplied from the drive circuit 504, the solid-state imaging apparatus 501 transfers a signal. The signal processing circuit 505 performs various kinds of signal processing on the signal output from the solid-state imaging apparatus 501. The video signal on which the signal processing has been performed is stored in a storage medium such as a memory or output to a monitor.

Note that Steps describing the series of processing described herein of course include processing performed in time series in the described order and the series of processing do not necessarily need to be processed in time series. The series of processing may also include processing performed in parallel or individually.

Further, embodiments of the present disclosure are not limited to the above-mentioned embodiments and may be variously changed without departing from the essence of the present disclosure.

Furthermore, in the above, the structure described as one apparatus (or processing unit) may be divided into a plurality of apparatuses (or processing units). In contrast, the structures described as the plurality of apparatuses (or processing units) may be configured as one apparatus (or processing unit). Further, to the structures of the apparatuses (or processing units), additional structure other than the structures described above may be of course provided. Further, a part of the structure of a certain apparatus (or processing unit) may be included in the structure of another apparatus (or another processing unit), if the structure and operation of the entire system is substantially equal thereto. That is, the present technology is not limited to the above embodiments and can be variously modified without departing from the essence of the present technology.

The favorable embodiments of the present disclosure are described above in detail with reference to the attached drawings. However, the present disclosure is not limited to the above examples. It is obvious that those skilled in the art to which the present disclosure belongs can conceive various modified examples within the scope of the technical idea described in the scope of the appended claims, and it is understood that those examples of course belong to the technical scope of the present disclosure.

REFERENCE SIGNS LIST 1 solid-state imaging apparatus
2 pixel
21 gated imaging apparatus
22 fog
23 subject
31 control unit
32 light emitting unit
33 imaging unit
50 gated imaging system
51 gated imaging apparatus
52, 52-1, 52-2 fog
53, 53-1 to 53-3 subject
61 light emitting unit
62 image sensor
70 gated imaging apparatus
71 control unit
72 output terminal
81 PD
82-1, 82-2 memory
83 switch
91 setting unit
92 exposure control unit
100 gated imaging system
101 automobile
111 pulsed light
112 reflected light
150 gated imaging system
200 gated imaging system
211 pillar
212 wall
250 gated imaging system
261 subject determination unit
281 to 284 image
500 electronic apparatus
501 solid-state imaging apparatus
502 optical lens
503 shutter apparatus
504 drive circuit
505 signal processing circuit

The invention claimed is:

1. An imaging apparatus, comprising:
a light emitting unit that performs pulse emission;
a light reception unit that receives light;
an exposure control unit that causes the light reception unit to perform a plurality of times of exposure per pulse emission from the light emitting unit; and a setting unit that sets, depending on a predetermined imaging distance range, a start time and an end time of the plurality of times of exposure by using timing of the pulse emission as a reference to perform imaging processing on a subject within the predetermined imaging distance range.

2. The imaging apparatus according to claim 1, wherein the predetermined imaging distance range includes one to n (n being an integer not less than 2) imaging distance ranges, and when the i-th (i=1 to n) distance range of the predetermined imaging distance range is represented by Min(i) to Max(i) (Min(i)<Max(i)), the number of times of the exposure is n, and the setting unit sets a start time and an end time of the j-th (j=1 to n) exposure of the n times of exposure to $(2 \times Min(i))/c$ and $(2 \times Max(i))/c$ (c representing a speed of light), respectively.

3. The imaging apparatus according to claim 1, wherein an amount of light received by the light reception unit is stored in any of 1 to m (m representing an integer not less than 2) memories, and when the predetermined imaging distance range is represented by Min to Max (Min<Max), the number of times of the exposure is m, the setting unit sets a start time and an end time of the j-th (j=1 to n) exposure of the m times of exposure to $(2 \times Min)/c + 2 \times (Max-Min) \times (j-1)/c/m$ and $2 \times Min/c + 2 \times (Max-Min) \times j/c/m$ (c representing a speed of light), respectively, and the control unit performs such control that an amount of light received in the j-th (j=1 to n) exposure of the m times of exposure is stored in the j-th memory of the m memories.

4. The imaging apparatus according to claim 3, further comprising a subject identification unit that identifies a memory storing no data of a projected image of the subject out of the m memories, wherein in a case where the memory storing no data of the projected image of the subject identified by the subject identification unit is the p-th memory and p=m or p substantially equals to m, a smaller value is reset for at least one of a value of the Min and a value of the Max, and a parameter for next imaging is determined, or in a case where the memory storing no data of the projected image of the subject identified by the subject identification unit is the p-th memory and p=1 or p substantially equals to 1, a larger value is reset for at least one of a value of the Min and a value of the Max, and a parameter for next imaging is determined.

5. The imaging apparatus according to claim 1, wherein in each of s+1 (s representing an integer not less than 1) times of imaging processing on the subject, an amount of light received by the light reception unit is stored in any of a first memory and a second memory, the predetermined imaging distance range includes 1 to (2 to the s-th power) imaging distance ranges, and when the k-th (k=1 to 2 to the s-th power) distance range of the predetermined imaging distance range is represented by Min(k) to Max(k) (Min(k)<Max(k)), the number of times of the exposure is $2 \times (2$ to the s-th power), the setting unit sets a start time and an end time of the 2×k−1-th (k=1 to 2 to the s-th power) exposure of the (2 to the s-th power) times of exposure to $2 \times Min(k)/c$, $2 \times Max(k)/c + 2 \times (Max(k)-Min(k))/c/2$, and $2 \times Max(k)/c$ (c representing a speed of light), respectively, and sets a start time and an end time of the 2×k-th (k=1 to 2 to the s-th power) exposure of the (2 to the s-th power) times of exposure to $2 \times Min(k)/c + 2 \times (Max(k)-Min(k))/c/$ and $2 \times Max(k)/c$ (c representing a speed of light), and in the q-th (q representing 1 to s+1) imaging processing, the control unit performs such control that an amount of light received by the light reception unit in the 2×k−1-th (k=1 to 2 to the s-th power) exposure of the (2 to the s-th power) times of exposure is stored in the r(k,q)-th (r(k,q) representing 1 or 2) memory of the first memory and the second memory, and an amount of light received by the light reception unit in the 2×k-th (k=1 to 2 to the s-th power) exposure of the (2 to the s-th power) times of exposure is stored in a memory other than the r(k,q)-th (r(k,q) representing 1 or 2) memory of the first memory and the second memory, and determines r(k,q) so that a sequence $\{r(k,1), r(k,2), \ldots r(k,s+1)\}$ is different from a sequence $\{r(k',1), r(k',2), \ldots r(k',s+1):$ where $k' \neq k\}$ and a sequence $\{3-r(k',1), r(k',2), \ldots r(k',s+1):$ where $k' \neq k)$ for k being an arbitrary value.

6. The imaging apparatus according to claim 5, further comprising a subject identification unit that identifies a memory storing no data of a projected image of the subject out of the first memory and the second memory, wherein in each of s+1 (s representing an integer not less than 1) times of imaging processing on the subject, the setting unit resets, corresponding to the number of the memory storing no data of the projected image of the subject identified by the subject identification unit, a smaller value for at least one of a value of the Min and a value of the Max, and determines a parameter for next imaging.

7. The imaging apparatus according to claim 3, further comprising a subject identification unit that identifies the j-th (j=1 to n) memory storing data of a projected image of the subject out of the m memories, wherein when the number of the memory storing the data of the projected image of the subject identified by the subject identification unit is q, the setting unit newly sets the Min to $2 \times Min/c + 2 \times (Max-Min) \times (q-1)/c/m$ and the Max to $2 \times Min/c + 2 \times (Max-Min) \times q/c/m$ (c representing a speed of light), and determines a parameter for next imaging.

8. An electronic apparatus, comprising:

a light emitting unit that performs pulse emission;

a light reception unit that receives light;

an exposure control unit that causes the light reception unit to perform a plurality of times of exposure per pulse emission from the light emitting unit; and a setting unit that sets, depending on a predetermined imaging distance range, a start time and an end time of the plurality of times of exposure by using timing of the pulse emission as a reference to perform imaging processing on a subject within the predetermined imaging distance range.

* * * * *